(12) United States Patent
Johnsson et al.

(10) Patent No.: US 9,940,151 B2
(45) Date of Patent: Apr. 10, 2018

(54) HYPERVISOR AND PHYSICAL MACHINE AND RESPECTIVE METHODS THEREIN FOR PERFORMANCE MEASUREMENT

(71) Applicant: TELEFONAKTIEBOLAGET L M ERICSSON (PUBL), Stockholm (SE)

(72) Inventors: Andreas Johnsson, Uppsala (SE); Ramide A. S Dantas, Recife (BR); Christofer Flinta, Stockholm (SE); Catalin Meirosu, Solna (SE); Djamel Sadok, Jaboatão dos Guararapes (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 228 days.

(21) Appl. No.: 14/776,182

(22) PCT Filed: Mar. 15, 2013

(86) PCT No.: PCT/SE2013/050273
§ 371 (c)(1),
(2) Date: Sep. 14, 2015

(87) PCT Pub. No.: WO2014/142723
PCT Pub. Date: Sep. 18, 2014

(65) Prior Publication Data
US 2016/0026490 A1   Jan. 28, 2016

(51) Int. Cl.
G06F 9/455 (2006.01)
H04L 12/26 (2006.01)
H04L 12/741 (2013.01)

(52) U.S. Cl.
CPC ...... G06F 9/45558 (2013.01); H04L 43/0864 (2013.01); H04L 43/106 (2013.01);
(Continued)

(58) Field of Classification Search
CPC ....... G06F 9/45558; G06F 2009/45591; G06F 2009/45595; H04L 43/0864; H04L 43/106; H04L 45/74
See application file for complete search history.

(56) References Cited

U.S. PATENT DOCUMENTS

2010/0082995 A1   4/2010   Dees et al.
2010/0322085 A1*  12/2010  Kalbag ............... H04L 12/4641
                                                         370/249
(Continued)

FOREIGN PATENT DOCUMENTS

JP   2011203810 A   10/2011
WO   2004023740 A1   3/2004
WO   2011096859 A1   8/2011

OTHER PUBLICATIONS

Abujoda, Network Measurement in Virtualized Networks and its Challenges, 6th GI/ITG KuVS Workshop on Future Internet, Nov. 22, 2010.

(Continued)

Primary Examiner — James J Lee

(57) ABSTRACT

A method performed by a hypervisor executing a virtual machine for enabling a performance measurement between the virtual machine and a peer node, and a method performed by a physical machine comprising the hypervisor are provided. The method performed by the hypervisor comprises intercepting a packet transmitted from, or destined to, the virtual machine, the packet comprising a destination address to the virtual machine or to the peer node, and determining whether to insert a hypervisor time stamp or not in the packet. The method further comprises, when it is determined to insert the hypervisor time stamp in the packet, inserting a hypervisor time stamp in the packet, and forwarding the packet to its destination according to the destination address.

20 Claims, 14 Drawing Sheets

(52) U.S. Cl.
CPC .... *H04L 45/74* (2013.01); *G06F 2009/45591* (2013.01); *G06F 2009/45595* (2013.01)

(56) References Cited

U.S. PATENT DOCUMENTS

| | | | |
|---|---|---|---|
| 2011/0307889 A1 | 12/2011 | Moriki et al. | |
| 2013/0100816 A1* | 4/2013 | Bergamasco | H04L 43/0864 370/237 |
| 2014/0029441 A1* | 1/2014 | Nydell | H04L 43/0864 370/241.1 |
| 2014/0029442 A1* | 1/2014 | Wallman | H04L 69/22 370/241.1 |
| 2014/0056157 A1* | 2/2014 | Hedlund | H04W 24/02 370/252 |

OTHER PUBLICATIONS

Dantas, et al., KVM Virtualization Impact on Active Round-Trip Time Measurements, 2015 IFIP/IEEE International Symposium on Integrated Network Management (IM), pp. 810-813, May 1, 2015.

Whiteaker, et al., Explaining Packet Delays under Virtualization, ACM SIGCOMM Computer Communication Review, vol. 41, No. 1, Jan. 2011; pp. 39-44.

Voith, et al., A Path Supervision Framework a Key for Service Monitoring in Infrastructure as a Service (IaaS) Platforms, 2010 36th EUROMICRO Conference on Software Engineering and Advanced Applications, Sep. 1-3, 2010, pp. 127-130.

Postel, Internet Control Message Protocol, RFC 792, 1981, 22 pages.

Chimento, et al., Defining Network Capacity, RFC 5136, Feb. 2008, 14 pages.

Series Y: Global Information Infrastructure, Internet Protocol Aspects and Next-Generation Networks, Internet protocol aspects—Quality of service and network performance, Internet protocol data communication service—IP packet transfer and availability performance parameters, Telecommunication Standardization Sector of ITU, Recommendation ITU-T Y.1540,Mar. 2011, 52 pages.

Shalunov, et al., A One-way Active Measurement Protocol (OWAMP), RFC 4656, Sep. 2006, 50 pages.

Hedayat, et al., A Two-Way Active Measurement Protocol (TWAMP), RFC 5357, Oct. 2008, 27 pages.

Morton, et al, Two-way Active Measurement Protocol (TWAMP) Reflects Octets and and Symmetrical Size Features, RFC 6038, Oct. 2010, 18 pages.

Baillargeon, et al., Ericsson Two-Way Active Measurement Protocol (TWAMP) Value-Added Octets, RFC 6802, Nov. 2012, 16 pages.

Cisco IOS IP SLAs Overview, Cisco IOS IP SLAs Configuration Guide, May 2, 2005, 12 pages.

Amazon Web Services: Amazon Elastic Compute Cloud (Amazon EC2), Mar. 7, 2013, 16 pages.

Morton, et al., Reporting Metrics: Different Points of View, draft-ietf-ippm-reporting-metrics-02, Network Working Group, May 30, 2010, 22 pages.

* cited by examiner

| 701 | Sequence Number | | | | |
|---|---|---|---|---|---|
| 702 | Timestamp t1 | | | | |
| 703 | Error Estimate | 704 | Ver=2 | 705 | Reserved |
| 706 | Hypervisor Timestamp ht1 | | | | |
| 707 | Hypervisor Timestamp ht2 | | | | |
| 708 | Hypervisor Timestamp ht3 | | | | |
| 709 | Hypervisor Timestamp ht4 | | | | |
| 710 | Additional Packet Padding | | | | |

Fig. 7a

| 801 Type | 802 Code | 803 Header Checksum |
|---|---|---|
| 804 Identifier | | 805 Checksum |
| 806 | Originate Timestamp t1 | |
| 807 | Hypervisor Timestamp ht1 | |
| 808 | Hypervisor Timestamp ht2 | |

Fig. 8a

| 801 Type | 802 Code | 803 Header Checksum |
|---|---|---|
| 804 Identifier | | 805 Checksum |
| 806 | Originate Timestamp t1 | |
| 809 | Receive Timestamp t2 | |
| 810 | Transmit Timestamp t3 | |
| 807 | Hypervisor Timestamp ht1 | |
| 808 | Hypervisor Timestamp ht2 | |
| 811 | Hypervisor Timestamp ht3 | |
| 812 | Hypervisor Timestamp ht4 | |

Fig. 8b

HYPERVISOR AND PHYSICAL MACHINE AND RESPECTIVE METHODS THEREIN FOR PERFORMANCE MEASUREMENT

This application is a 371 of International Application No. PCT/SE2013/050273, filed Mar. 15, 2013, the disclosure of which is fully incorporated herein by reference.

TECHNICAL FIELD

The present disclosure relates to performance measurements between two nodes and in particular to performance measurement when at least one of the nodes runs a hypervisor executing a virtual machine.

BACKGROUND

In communication networks, it is often very desirable to measure the performance of the communication network, e.g. by measuring round-trip-time, RTT, and other performance parameters between two nodes of the communication network. Such measurement may give an indication of the performance of the communication network.

Such measurements are typically initiated by one of the nodes and performed towards a peer node with which the initiating node is communicating. The result gives an indication of e.g. if the communication network is heavily loaded or if a failure has occurred in the communication network.

Virtualisation of networks and computers is common today. One example for computer virtualisation that can be utilised by more or less anyone is the Amazon Elastic Compute Cloud. It is a service that provides dynamic computer capacity to their customers. Also, computer virtualisation is common in data centres where resources are shared in order to increase utilisation of hardware.

In FIG. 4a which will be described in more detail below, an example of a virtualised computer is shown. Instead of running one operating system on top of the hardware, a hypervisor runs as a middleware between the virtual machines/operating systems and the hardware. The hypervisor acts as a hardware controller that manages the shared recourses among the virtual machines (in which operating systems can run). The main intent of the hypervisor is to instantiate the virtual machines, provision the resources and make sure that the resources are shared in a fair (or according to a Service Level Agreement, SLA) manner among the executing operating systems.

Active probing is an accepted method for determining performance parameters of packet-switched networks. The basic concept is to transmit probe-packets from a sender towards a receiver. Each probe-packet train is time stamped on both sides.

The Internet Engineering Task Force, IETF, Internet Protocol Performance Metrics (IPPM) working group has defined two IP active measurement protocols: One-Way Active Measurement Protocol, OWAMP, and Two-Way Active Measurement Protocol, TWAMP. OWAMP is designed for measuring one-way packet delay and one-way packet loss between two hosts or nodes. TWAMP is based on OWAMP. TWAMP is designed for measuring one-way and two-way (round-trip) packet delay and packet loss between two hosts or nodes.

The standard TWAMP protocols consist of two protocols: the TWAMP control protocol and the TWAMP test protocol. The TWAMP control protocol is used to initiate, start and stop TWAMP test sessions. The TWAMP test protocol is used to exchange TWAMP test packets between two TWAMP hosts or endpoints. Test sessions can also be configured without the TWAMP control protocol and this is known as TWAMP light.

The standard TWAMP measurement architecture is usually comprised of only two hosts with specific roles. This is known as the two-host implementation. One host plays the role of the initiator or controller and session-sender and the other host plays the role of the server and the session-reflector. In the standard architecture, the different roles can be played by different hosts.

The host that initiates the TWAMP control Transport Control Protocol, TCP, connection takes the roles of the controller and session-sender. The host that acknowledges the TWAMP control TCP connection accepts the roles of the server and session-reflector.

In a TWAMP test session, packets are time stamped, tagged with sequence numbers and transmitted from a session-sender to a session-reflector. The session-reflector time stamps the incoming packets, create new test packets (one packet is created for each test packet received by the session-reflector) and send them to the session-sender as soon as possible. Using these time stamps and sequence numbers, the session-sender can then calculate the one-way delay, jitter, round-trip time and packet loss for the session in both the forward path and the reverse path.

However, there is no way to determine how the virtualisation affects the performance between the two hosts. The impact of the virtualisation may very well be non-negligible and may sometimes be quite high. From a network diagnosis perspective, it may be important to determine and also localise the root or cause of e.g. an increased round trip time, RTT.

SUMMARY

The object is to obviate at least some of the problems outlined above. In particular, it is an object to provide a hypervisor and a method performed by the hypervisor for enabling a performance measurement between a virtual machine associated with the hypervisor and a peer node. It is a further object to provide a physical machine comprising at least one hypervisor executing at least one virtual machine and a method performed by the physical machine for performing a performance measurement between the virtual machine and the peer node when the virtual machine is the initiator of the measurement between the virtual machine and the peer node. Still further, it is an object to provide a physical machine comprising at least one hypervisor executing at least one virtual machine and a method performed by the physical machine for performing a performance measurement between the virtual machine and the peer node when the peer node is the initiator of the measurement between the virtual machine and the peer node. These objects and others may be obtained by providing a hypervisor, a respective physical machine and a respective method in a hypervisor and a respective physical machine according to the independent claims attached below.

According to an aspect, a method performed by the hypervisor for enabling a performance measurement between a virtual machine associated with the hypervisor and a peer node is provided. The method comprises intercepting a packet transmitted from, or destined to, the virtual machine, the packet comprising a destination address to the virtual machine or to the peer node, and determining whether to insert a hypervisor time stamp or not in the packet. The method further comprises, when it is determined to insert the hypervisor time stamp in the packet, inserting a hypervisor time stamp in the packet, and forwarding the packet to its destination according to the destination address.

According to an aspect, a method performed by a physical machine comprising at least one hypervisor executing at least one virtual machine for performing a performance measurement between the virtual machine and the peer node when the virtual machine is the initiator of the measurement between the virtual machine and the peer node is provided. The method comprises the virtual machine creating the packet which is to be transmitted to the peer node; the virtual machine initialising the packet comprising inserting a first virtual machine time stamp in the packet; and the virtual machine transmitting the packet towards the peer node. The method further comprises the hypervisor intercepting the packet transmitted from the virtual machine; the hypervisor inserting a first hypervisor time stamp in the packet; and the hypervisor forwarding the packet towards the peer node. Still further, the method comprises the hypervisor intercepting the packet when it is transmitted back to the virtual machine from the peer node; the hypervisor inserting a further hypervisor time stamp in the packet, and the hypervisor forwarding the packet to the virtual machine. The method also comprises the virtual machine generating a last virtual machine time stamp for the packet.

According to an aspect, a method performed by a physical machine comprising at least one hypervisor executing at least one virtual machine for performing a performance measurement between the virtual machine and the peer node when the peer node is the initiator of the measurement between the virtual machine and the peer node is provided. The method comprises the hypervisor intercepting the packet destined to the virtual machine; the hypervisor inserting the hypervisor time stamp in the packet; and the hypervisor forwarding the packet to the virtual machine. The method further comprises the virtual machine inserting a virtual machine time stamp in the packet; the virtual machine inserting a further virtual machine time stamp in the packet, and the virtual machine transmitting the packet back towards the peer node from which it was received. The method also comprises the hypervisor intercepting the packet destined to the peer node; the hypervisor inserting a further hypervisor time stamp in the packet, and the hypervisor forwarding the packet towards the peer node.

According to an aspect, a hypervisor associated with a virtual machine, adapted for enabling a performance measurement between the virtual machine and a peer node is provided. The hypervisor comprises an intercepting unit adapted for intercepting a packet transmitted from, or destined to, the virtual machine, the packet comprising a destination address to the virtual machine or to the peer node, and determining whether to insert a hypervisor time stamp or not in the packet. The hypervisor also comprises an inserting unit adapted for, when it is determined to insert the hypervisor time stamp in the packet, inserting a hypervisor time stamp in the packet; and a forwarding unit adapted for forwarding the packet to its destination according to the destination address.

According to an aspect, a physical machine comprising at least one hypervisor executing at least one virtual machine adapted for performing a performance measurement between the virtual machine and a peer node when the virtual machine is the initiator of the measurement between the virtual machine and the peer node is provided. The physical machine comprises the virtual machine comprising a creating unit adapted for creating the packet which is to be transmitted to the peer node, wherein the virtual machine further comprises an initialising unit adapted for initialising the packet by inserting a first virtual machine time stamp in the packet, and a transmitting unit adapted for transmitting the packet towards the peer node. The physical machine further comprises the hypervisor comprising the intercepting unit adapted for intercepting the packet transmitted from the virtual machine, the inserting unit adapted for inserting a first hypervisor time stamp in the packet, the forwarding unit adapted for forwarding the packet towards the peer node, wherein the intercepting unit further is adapted for intercepting the packet when it is transmitted back to the virtual machine from the peer node, the inserting unit further is adapted for inserting a further hypervisor time stamp in the packet, and the forwarding unit further is adapted for forwarding the packet to the virtual machine. The initialising unit of the virtual machine further is adapted for generating a last virtual machine time stamp.

According to an aspect, a physical machine comprising at least one hypervisor executing at least one virtual machine adapted for performing a performance measurement between the virtual machine and a peer node when the peer node is the initiator of the measurement between the virtual machine and the peer node is provided. The method comprises the hypervisor comprising the intercepting unit adapted for intercepting the packet destined to the virtual machine, the inserting unit adapted for inserting the hypervisor time stamp in the packet, and the forwarding unit adapted for forwarding the packet to the virtual machine. The physical machine also comprises the virtual machine comprising the initialising unit adapted for inserting a virtual machine time stamp in the packet, the initialising unit adapted for inserting a further virtual machine time stamp in the packet, the transmitting unit adapted for transmitting the packet back towards the peer node from which it was received. The intercepting unit of the hypervisor is adapted for intercepting the packet destined to the peer node, and the inserting unit is adapted for inserting a further hypervisor time stamp in the packet, and the forwarding unit is adapted for forwarding the packet towards the peer node.

The hypervisor, the physical machine comprising at least one hypervisor when the virtual machine is the initiator of the measurement, the physical machine comprising at least one hypervisor when the peer node is the initiator of the measurement, and the respective method performed by the hypervisor and the respective physical machine have several advantages. One advantage is that it is possible to extract more information from the test packet once the packet has traveled its course. The hypervisor time stamp(s) enables localisation of possible performance degradation from end-to-end active measurements using standardised protocols, the degradation may either be due to the virtualisation or due to the network interconnecting the physical machine (on which the virtual machine is running) and the peer node. Another advantage is that the method may provide functionality for system diagnoses, e.g. if a possible problem is due to the virtualisation on a specific hardware of the physical machine or due to the network. Still an advantage is that there is no impact on the virtual machine, only in the hypervisor which is transparent to the virtual machine. Still further, the method may enable a user of a Cloud (or virtual machine) to study performance of the hypervisor and measure Service Level Agreements, SLAs.

BRIEF DESCRIPTION OF DRAWINGS

Embodiments will now be described in more detail in relation to the accompanying drawings, in which:

FIG. 7a is a block diagram an exemplifying test packet format based on TWAMP.

FIG. 8a is a block diagram an exemplifying test packet format based on ICMP.

FIG. 8b is a block diagram another exemplifying test packet format based on ICMP.

DETAILED DESCRIPTION

Briefly described, exemplifying embodiments of a method performed by a hypervisor and a hypervisor adapted for enabling a performance measurement between a virtual machine and a peer node are provided. Further, a method performed by a physical machine and a physical machine, comprising a hypervisor, adapted for performing a performance measurement between the virtual machine and a peer node are provided. The hypervisor and the physical machine enable to measure performance between a virtual machine running on the hypervisor of the physical machine and a peer node.

An exemplifying embodiment of a method performed by a hypervisor for enabling performance measurement between a virtual machine and a peer node will now be described with reference to FIG. 1. The hypervisor is associated with the virtual machine.

Figure 1:
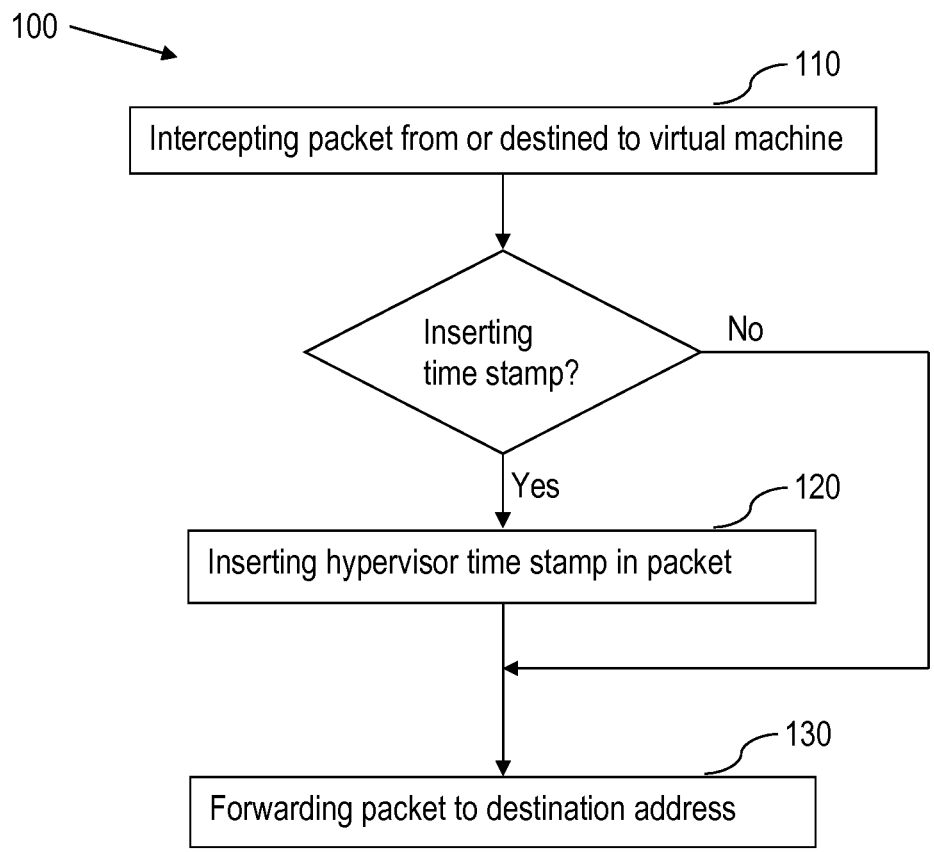
FIG. 1 is a flowchart of a method performed by a hypervisor for enabling a performance measurement between a virtual machine and a peer node are provided.

FIG. 1 illustrates the method 100 performed by the hypervisor associated with the virtual machine for enabling a performance measurement between the virtual machine and the peer node comprising intercepting 110 a packet transmitted from, or destined to, the virtual machine, the packet comprising a destination address to the virtual machine or to the peer node, and determining whether to insert a hypervisor time stamp or not in the packet. The method further comprises, when it is determined to insert the hypervisor time stamp in the packet, inserting 120 a hypervisor time stamp in the packet, and forwarding 130 the packet to its destination according to the destination address.

The hypervisor runs on hardware of a physical machine, and the hypervisor in turn runs the virtual machine. The virtual machine is communicating with the peer node, which may or may not comprise a hypervisor running another virtual machine. It shall be pointed out that it is a program running on the virtual machine that communicates with the peer node, which will be explained in more detail below. All packets sent to or from the virtual machine will pass or go through the hypervisor in a transparent manner so the hypervisor is so to say invisible to the virtual machine and the peer node. When the virtual machine and the peer node communicate with each other, i.e. send different packets between each other, they use some sort of addresses or ports of the virtual machine and the peer node respectively.

The virtual machine and the peer node may not reside, or be located, within the same local network, but instead they may communicate with each other by means of one or more interconnected networks, e.g. the Internet. Alternatively, the virtual machine and the peer node reside on the same physical machine. The virtual machine (or a program running on the virtual machine) may be communicating with the physical machine (or a program running on the physical machine). The peer node may also be a virtual machine running on the same hypervisor, or another hypervisor, which is/are being run on the physical machine.

E.g. a user of the virtual machine, or of the peer node, may want to check the performance of the communication between the virtual machine and the peer node. However, it may also be an application executed by the virtual machine or the peer node that regularly or randomly determines to check the performance of the communication between the virtual machine and the peer node. One example of checking the performance is by sending test packets, e.g. ping messages/packets between the virtual machine and the peer node. The test packets provide the user with information regarding e.g. delay or time it takes when transmitting a test packet from the virtual machine to the peer node until the packet is returned and received at the virtual machine. Of course the peer node may be the initiator and then the test packet provides information to the user of the peer node regarding e.g. the time it takes for transmitting the test packet to the virtual machine until the test packet is returned and received at the peer node.

As stated above, packets sent to or from the virtual machine may pass transparently through the hypervisor. If a test packet would just go through the hypervisor, the conclusions that may be deduced from the information of the test packet, e.g. round trip time, only relate to the time the packet travels to, from or between the virtual machine and the peer node.

The method comprises the hypervisor intercepting 110 the packet transmitted from, or destined to, the virtual machine, the packet comprising a destination address to the virtual machine or to the peer node. This means that either the virtual machine transmits the test packet to the peer node or the packets has been transmitted from the peer node and is addressed to the virtual machine. The hypervisor determines whether to insert a hypervisor time stamp or not in the packet. This will be explained in more detail below, but in short the hypervisor looks at, or examines, the packet and if one or more criteria is fulfilled, then the hypervisor determines that a hypervisor time stamp shall be inserted into the packet. Thus, when it is determined to insert the hypervisor time stamp in the packet, the method comprises the hypervisor inserting 120 a hypervisor time stamp in the packet. Then the hypervisor forwards 130 the packet to its destination according to the destination address, i.e. either forwards the packet to the virtual machine or forwards the packet towards the peer node.

The method performed by the hypervisor has several possible advantages. One advantage is that it is possible to extract more information from the test packet once the packet has travelled its course. The hypervisor time stamp(s) enables localisation of possible performance degradation from end-to-end active measurements using standardised protocols, the degradation may either be due to the virtualisation or due to the network interconnecting the physical machine (on which the virtual machine is running) and the peer node. Another advantage is that the method may provide functionality for system diagnoses, e.g. if a possible problem is due to the virtualisation on a specific hardware of the physical machine or due to the network. Still an advantage is that there is no impact on the virtual machine, only in the hypervisor which is transparent to the virtual machine. Still further, the method may enable a user of a Cloud (or virtual machine) to study performance of the hypervisor and measure Service Level Agreements, SLAs.

According to an embodiment, determining whether to insert the hypervisor time stamp or not in the packet is based on properties of the packet such as address and port number.

If a packet is a test packet, the packet may comprise information that makes it possible for the hypervisor to determine that it should insert a hypervisor time stamp into the packet. Once the hypervisor has intercepted the packet, the hypervisor may look at session parameters comprised in the packet, such as e.g. sender Internet Protocol, IP address, receiver IP address, sender port, receiver port. If the packet e.g. comprises a specific sender port or receiver port, the hypervisor is able to determine that the packet is a test packet and the hypervisor shall insert a hypervisor time stamp into the packet.

According to still an embodiment, determining whether to insert the hypervisor time stamp or not in the packet is based on the packet being of a predetermined protocol.

For example when the packet is of a Two-Way Active Measurement Protocol, TWAMP, or an Internet Control Message Protocol, ICMP, then the hypervisor time stamp is to be inserted into the packet Typically, a test packet is of a specific protocol, i.e. the virtual machine running on the hypervisor employs a specific test protocol in order to supervise, monitor or test the connection, or network, between the virtual machine and the peer node. Also, when data is sent between the virtual machine and the peer node, another specific protocol may be used, e.g. IP or Transport Control Protocol, TCP, in combination with IP, i.e. TCP/IP. There are many other examples of communication protocols that the virtual machine and the peer node may use to communicate data with each other.

As stated above, when tests or measurements are to be performed between the virtual machine and the peer node, a specific test protocol is used, and two examples of a test protocols are TWAMP and ICMP.

It shall be noted, that these are just examples and other test protocols may be employed. Further, it may also be that the decision whether to insert a hypervisor time stamp or not into the packet may be based on one or more of the above examples, and also in combination with other criteria, such that a packet of e.g. TWAMP or ICMP will not necessarily have a hypervisor time stamp inserted into it due to the criterion/criteria.

Embodiments herein also relate to a method performed by a physical machine comprising at least one hypervisor executing at least one virtual machine as has been described above for performing a performance measurement between the virtual machine and a peer node when the virtual machine is the initiator of the measurement between the virtual machine and the peer node.

Such a method will now be described below with reference to FIG. 2a.

Figure 2A:
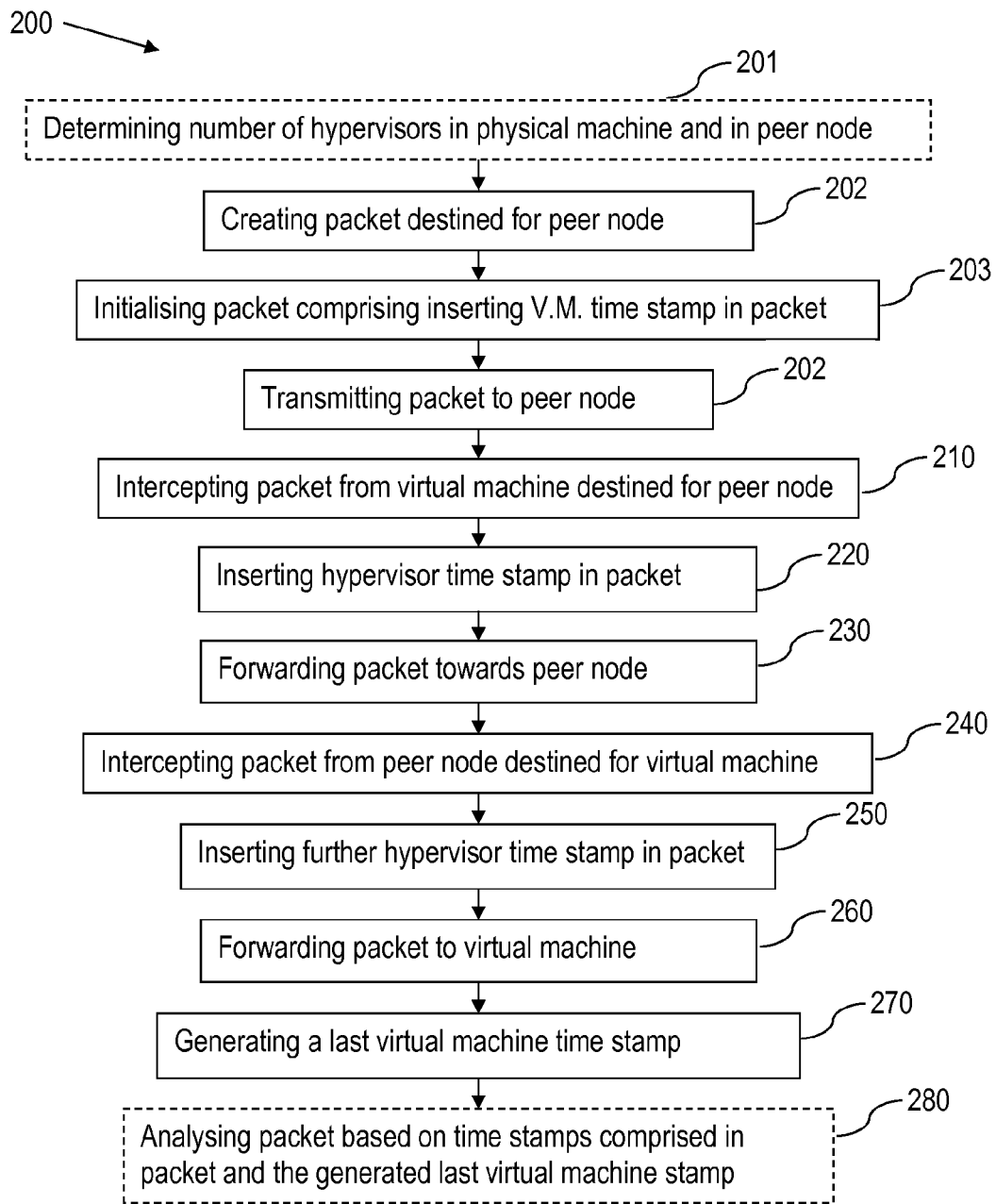
FIG. 2a is a flowchart of a method performed by a physical machine comprising at least one hypervisor executing at least one virtual machine, for performing a performance measurement between the virtual machine and a peer node when the virtual machine is the initiator of the measurement between the virtual machine and the peer node.

FIG. 2a illustrates the method 200 performed by the physical machine comprising the virtual machine creating 202 the packet which is to be transmitted to the peer node; the virtual machine initialising 203 the packet comprising inserting a first virtual machine time stamp in the packet; and the virtual machine transmitting 204 the packet towards the peer node. The method further comprises the hypervisor intercepting 210 the packet transmitted from the virtual machine; the hypervisor inserting 220 a first hypervisor time stamp in the packet; and the hypervisor forwarding 230 the packet towards the peer node. Still further, the method comprises the hypervisor intercepting 240 the packet when it is transmitted back to the virtual machine from the peer node; the hypervisor inserting 250 a further hypervisor time stamp in the packet, and the hypervisor forwarding 260 the packet to the virtual machine. The method also comprises the virtual machine generating 270 a last virtual machine time stamp for the packet.

The physical machine again runs the hypervisor on hardware comprised in the physical machine and the virtual machine is running on the hypervisor. The physical machine is connected, by means of a communication network, to the peer node. In this manner, the virtual machine running on the hypervisor of the physical machine is enabled to communicate with the peer node.

When a performance measurement is to be performed by the virtual machine and the peer node, either the virtual machine or the peer node may be the initiator. The other party may then be referred to as a reflector or reflecting party. In this embodiment, the virtual machine is the initiator.

There may be an application running on the virtual machine, which application controls the performance measurement. This will be explained in more detail later with reference to FIG. 4b.

The method comprises the virtual machine creating 202 the packet which is to be transmitted to the peer node. This packet is a test packet which is to be transmitted to the peer node and reflected back, i.e. received by the peer node and then transmitted back to the virtual machine.

Once the virtual machine has created the packet, the virtual machine initialises 203 the packet which comprises inserting a first virtual machine time stamp in the packet. In an example, the first virtual machine stamp takes place at time zero. The virtual machine then transmits 204 the packet towards the peer node. The virtual machine is unaware of the hypervisor, but the hypervisor will intercept 210 the packet and determine that a hypervisor time stamp is to be inserted. Thus the hypervisor inserts 220 a first hypervisor time stamp into the packet and forwards 230 the packet towards the peer node. By the virtual machine time stamp and the first hypervisor time stamp, the time passed between the virtual machine time stamp and the hypervisor time stamp is now "defined" or recorded so that it is possible later on to evaluate the time passed between the creation of the test packet and the time the test packet is transmitted from the physical machine. After some additional time has passed, the packet is returned from the peer node. The peer node has also inserted some time stamps into the packet, which will be explained in more detail below.

The virtual machine receives the packet, and the hypervisor intercepts 240 the packet when it is transmitted back to the virtual machine from the peer node. The hypervisor inserts 250 a further hypervisor time stamp in the packet and the hypervisor forwards 260 the packet to the virtual machine. Again, some time will pass from when the hypervisor inserts 250 the further hypervisor time stamp in the packet until the virtual machine receives the packet. When the virtual machine receives the packet, the virtual machine generates 270 a last virtual machine time stamp for the packet, which may or may not be inserted into the test packet.

In this manner, it is possible to analyse the packet and from the analysis it can be deduced how much of the total delay, e.g. RTT, is due to the network and how much of the delay is due to the virtualisation, i.e. the time between the virtual machine time stamp and the hypervisor time stamp in the physical machine.

In case the peer node also comprises a physical machine having hardware running a hypervisor, running a virtual machine, then the packet may comprise information relating to delay within the initiating virtual machine, delay in the communication network and delay within the peer node. Hence a much more detailed analysis may be performed on the test packet in order to possible find where a possible relatively long delay occurs, or is introduced. A relatively long delay may be due to the communication network, the peer node or the physical machine (initiator). It shall be pointed out that the peer node may also be just a physical machine. By being able to localise a possible fault or bottleneck, effective and specialised measures may be taken to improve the overall performance or to repair a possible fault where it has occurred.

The method performed by the physical machine may have the same advantages as the method performed by the hypervisor. One advantage is that it is possible to extract more information from the test packet once the packet has travelled its course. The hypervisor time stamp(s) enables localisation of possible performance degradation from end-to-end active measurements using standardised protocols, the degradation may either be due to the virtualisation or due to the network interconnecting the physical machine (on which the virtual machine is running) and the peer node. Another advantage is that the method may provide functionality for system diagnoses, e.g. if a possible problem is due to the virtualisation on a specific hardware of the physical machine or due to the network. Still an advantage is that there is no impact on the virtual machine, only in the hypervisor which is transparent to the virtual machine. Still further, the method may enable a user of a Cloud (or virtual machine) to study performance of the hypervisor and measure SLAs.

According to an embodiment, the method further comprises determining 201 the number of hypervisors of the physical machine on which the virtual machine is running and the number of hypervisors of the peer node and defining two hypervisor time stamp fields per hypervisor when creating the packet.

As described above, the physical machine comprises at least one hypervisor. In other words, the physical machine comprises hardware on which a first hypervisor is running. The hypervisor in turn is running or executing a first virtual machine. The first virtual machine in turn may run a second hypervisor on a virtual hardware and the second hypervisor may execute a second virtual machine. In this manner, a physical machine can be said to comprise at least one hypervisor. The same reasoning is valid for the peer node.

In order for all the hypervisors being able to insert time stamps into the packet, the packet must be sufficiently large to comprise all the different time stamps, hypervisor time stamps and the virtual machine time stamps. Since each hypervisor in the communication chain will insert two hypervisor time stamps, the packet must be of a size to be able to comprise two hypervisor time stamps per hypervisor. The packet may be initialised so that it comprises one field for each hypervisor time stamp and consequently comprises two hypervisor time stamp fields per hypervisor of the physical machine and the peer node.

According to still an embodiment, the method further comprises the virtual machine analysing 280 the packet based on the virtual machine time stamps, the hypervisor time stamps comprised in the packet and the last generated virtual machine time stamp.

In case the virtual machine is the initiator, the virtual machine executes, or runs, a test application, e.g. a TWAMP application or an ICMP application. The test application of the virtual machine creates the packet and initialises the packet as having been described above. After the test application/virtual machine has initiated the packet, inserted the first virtual machine time stamp, T1, into it and transmitted it towards the peer node, the test application/virtual machine receives the packet as it is returned from the peer node and the application/virtual machine generates the last virtual machine time stamp, T4, for the packet. By comparing the different time stamps in the packet, i.e. the hypervisor time stamps, HT1 and HT4, of the virtual machine, possibly also hypervisor time stamps, HT2 and HT3 of the peer node, the virtual/physical machine time stamps of the peer node and the last generated virtual machine time stamp for the packet, the test application/virtual machine may deduce the delay within the physical machine, within the peer node and within the communication network by means of which the physical machine and the peer node are communicating. In an example, assume the virtual machine is running on a hypervisor of the physical machine and the peer node is a virtual machine running on a hypervisor running on hardware of another physical machine. Then the packet, when received back at the initiating test application will comprise four virtual machine time stamps, T1-T4, and four hypervisor time stamps, HT1-HT4. When the initiating test application, i.e. the TWAMP initiator/controller, receives the test packet back from the peer node, the TWAMP initiator/controller is enabled to calculate different metrics as described above. E.g. the total round-trip time is estimated as T4-T1, the one-way delay in the forward direction is calculated as T2-T1, the one-way delay in the reverse direction is calculated as T4-T3. The TWAMP initiator/controller is further enabled to calculate the following metrics: delay in machine 1 due to virtualization in the forward direction is calculated as HT1-T1, delay in machine 2 due to virtualization in the forward direction is calculated as T2-HT2, delay in machine 2 due to virtualization in the reverse direction is calculated as HT3-T3, and delay in machine 1 due to virtualization in the reverse direction is calculated as T4-HT4. Further, calculation of total impact of e.g. the VM at the controller side may be performed by HT4-HT1. In this case the clocks do not need to be synchronized.

According to an embodiment, the virtual machine creating 202 the packet comprises an application executed by the virtual machine creating the test packet which is to be transmitted to the peer node.

As explained above, the virtual machine may execute a test application, e.g. a TWAMP application or an ICMP application, which is in control of the performance measurements. The test application thus creates the test packet which is to be transmitted to the peer node.

Embodiments herein also relate to a method 200 performed by the physical machine comprising at least one hypervisor executing at least one virtual machine as described above in conjunction with FIG. 1 for performing a performance measurement between the virtual machine and a peer node when the peer node is the initiator of the measurement between the virtual machine and the peer node. In other words, the virtual machine is the reflector or the reflecting party. Again, the peer node may be a physical machine or it may be a virtual machine executed by a hypervisor running of hardware of a physical machine.

Figure 2B:
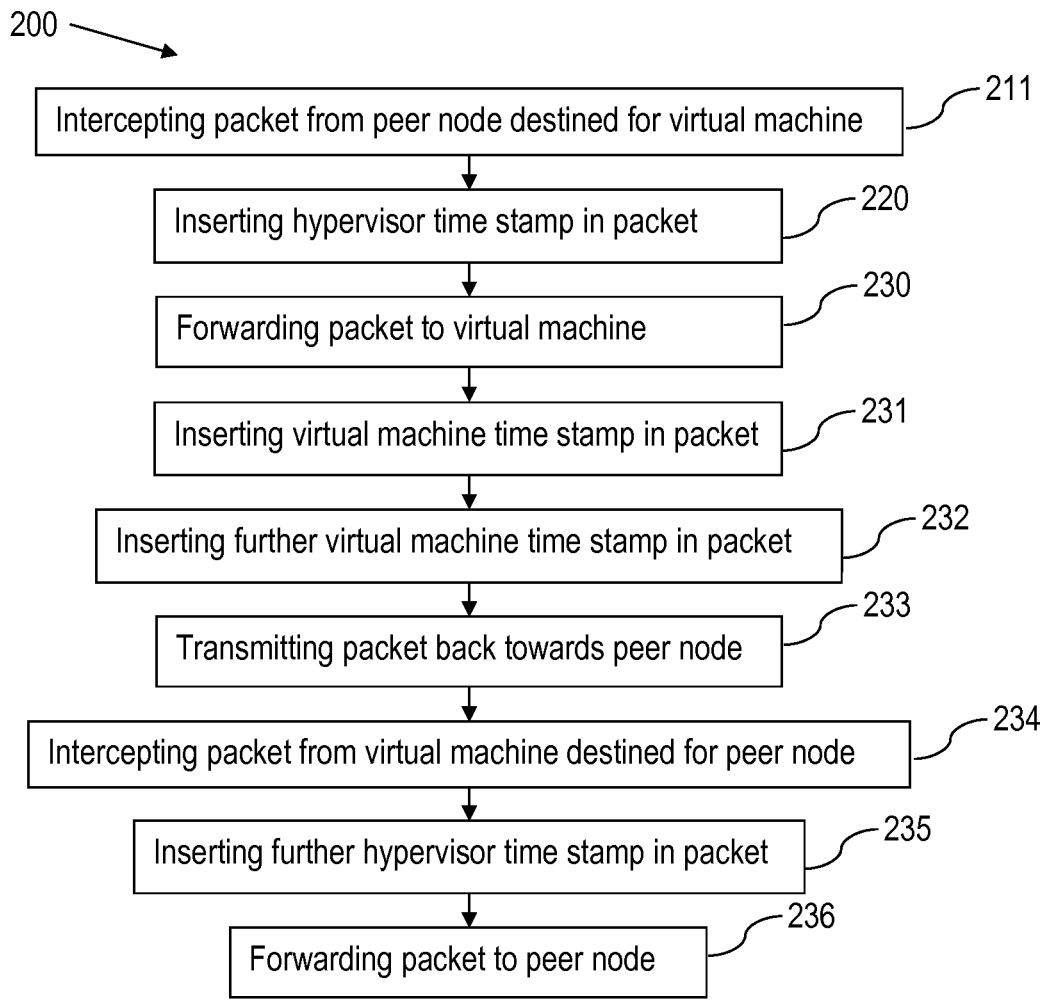
FIG. 2b is a flowchart of a method performed by a physical machine comprising at least one hypervisor executing at least one virtual machine, for performing a performance measurement between the virtual machine and a peer node when the peer node is the initiator of the measurement between the virtual machine and the peer node.

Such a method will now be described with reference to FIG. 2b. FIG. 2b illustrates the method comprising the hypervisor intercepting 211 the packet destined to the virtual machine; the hypervisor inserting 220 the hypervisor time stamp in the packet; and the hypervisor forwarding 230 the packet to the virtual machine. The method further comprises the virtual machine inserting 231 a virtual machine time stamp in the packet; the virtual machine inserting 232 a further virtual machine time stamp in the packet, and the virtual machine transmitting 233 the packet back towards the peer node from which it was received. The method also comprises the hypervisor intercepting 234 the packet destined to the peer node; the hypervisor inserting 235 a further hypervisor time stamp in the packet, and the hypervisor forwarding 236 the packet towards the peer node.

In this embodiment, the peer node is the initiator which means that the physical machine will receive the packet and time stamp the packet before returning the packet back to the peer node. As the physical machine receives the packet, the hypervisor intercepts 211 the packet. The packet is addressed to the virtual machine running on, or executed by, the hypervisor. The hypervisor inserts 220 a hypervisor time stamp in the packet and forwards 230 the packet to the virtual machine. By inserting the hypervisor time stamp, the time from when the physical machine receives the packet, i.e. the hypervisor inserting the hypervisor time stamp into the packet until the packet is received by the virtual machine may be measured. The virtual machine receives the packet and inserts 231 the virtual machine time stamp in the packet and inserts 232 the further virtual machine time stamp in the packet before transmitting 233 the packet back towards the peer node from which it was received. The hypervisor again intercepts 234 the packet now destined to the peer node and inserts 235 the further hypervisor time stamp in the packet, and forwards 236 the packet towards the peer node. By the different time stamps inserted into the packet by the physical machine, i.e. the two hypervisor time stamps and the two virtual machine time stamps, the packet comprises information from which conclusions may be deduced. It is possible to deduce the time passed from then the physical machine first receives the packet until the packet has reached the virtual machine, i.e. the time difference from when the first hypervisor time stamp until the first virtual machine time stamp. It is possible to deduce the time passed from when the virtual machine transmits the packet towards the peer node until it packet is actually transmitted from the physical machine, i.e. the difference between the second/further virtual machine time stamp and the second/further hypervisor time stamp. It is also possible to deduce the time passed from when the physical machine received the packet until the physical machine transmitted the packet back to the peer node, i.e. the time different between the first and the second/further hypervisor time stamp.

The method performed by the physical machine being the reflecting party has the same advantages as the hypervisor and the method performed by physical machine being the initiating party. One advantage is that it is possible to extract more information from the test packet once the packet has travelled its course. The hypervisor time stamp(s) enables localisation of possible performance degradation from end-to-end active measurements using standardised protocols, the degradation may either be due to the virtualisation or due to the network interconnecting the physical machine (on which the virtual machine is running) and the peer node. Another advantage is that the method may provide functionality for system diagnoses, e.g. if a possible problem is due to the virtualisation on a specific hardware of the physical machine or due to the network. Still an advantage is that there is no impact on the virtual machine, only in the hypervisor which is transparent to the virtual machine. Still further, the method may enable a user of a Cloud (or virtual machine) to study performance of the hypervisor and measure SLAs.

According to an embodiment, the virtual machine inserting 231 the virtual machine time stamp in the packet comprises an application executed by the virtual machine inserting the virtual machine time stamp in the packet.

As described above, the virtual machine may execute a test application, e.g. a TWAMP application or an ICMP application, which is in control of the performance measurements.

Figure 3A:
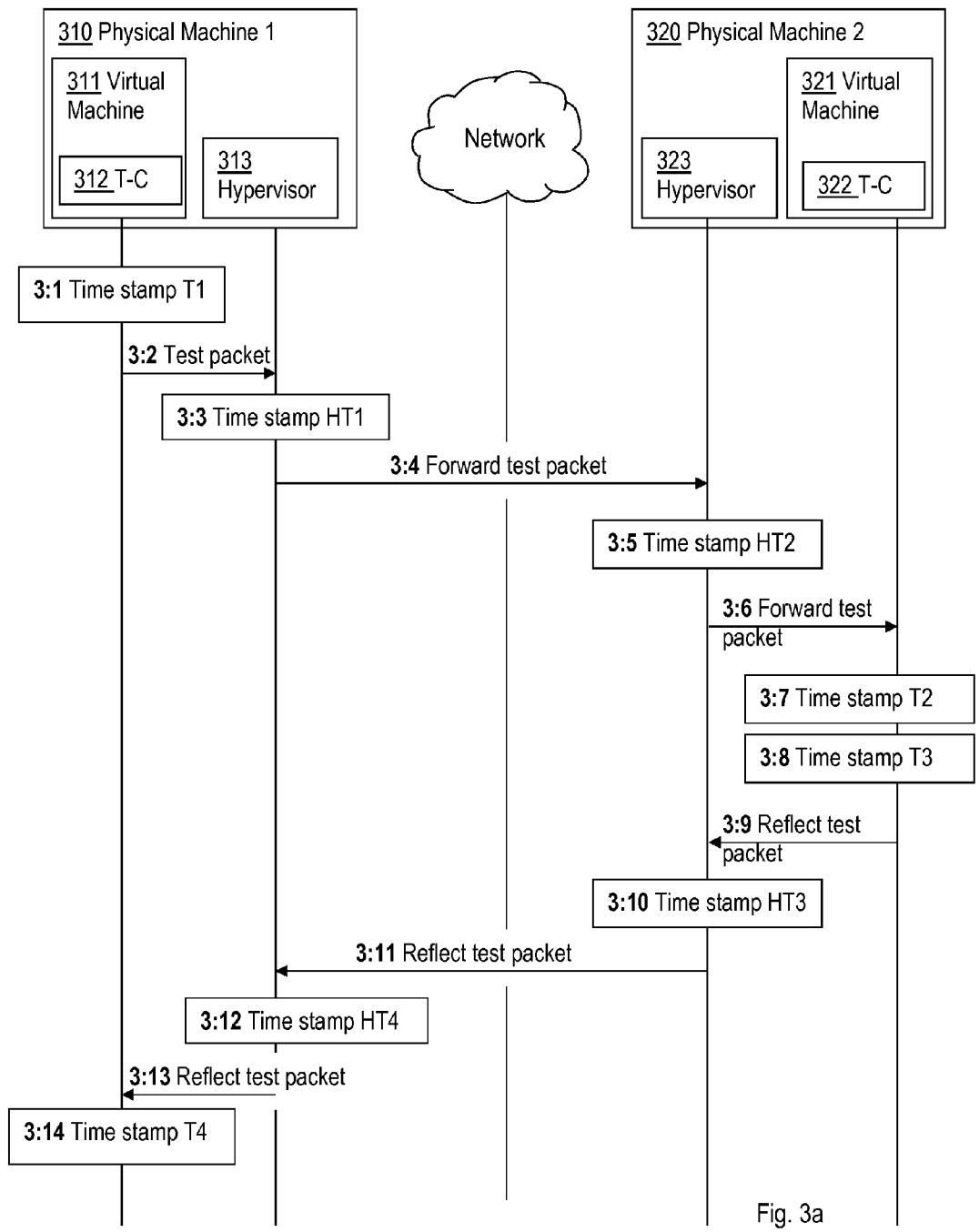
FIG. 3a is a signalling diagram exemplifying a performance measurement between a first and a second physical machine.

FIG. 3a is a signalling diagram exemplifying a performance measurement between a first and a second physical machine. In this example, both physical machines comprise hardware running a respective hypervisor executing a respective virtual machine. The first "Physical machine 1" 310 is the initiator or initiating party and the second "Physical machine 2" 320 is the reflector or reflecting party.

In the first physical machine 310, a hypervisor 313 is running on hardware of the first physical machine 310. The hypervisor 313 is executing a virtual machine 311, which in turn is executing a test application 312. The second physical machine 320 comprises hardware which runs a hypervisor 323, which in turn executes a virtual machine 321, which in turn executes a test application 322.

The virtual machine 311 of the first physical machine 310 creates and initiates a test packet. The initialisation comprises inserting 3:1 Time stamp T1 into the packet. The first virtual machine 310 then transmits 3:2 the test packet towards the virtual machine 321. The packet is intercepted by the hypervisor 313 of the physical machine 1 and the hypervisor 313 inserts 3:3 hypervisor time stamp HT1 into the packet. The hypervisor may further recalculate a packet checksum on an IP and Ethernet layer, and put the new checksum in place in the test packet. Then the hypervisor 313 forwards 3:4 the packet towards the virtual machine 321. The packet reaches the second physical machine 320, and is intercepted by the hypervisor 323. The hypervisor 323 inserts 3:5 a hypervisor time stamp HT2 into the packet, recalculates the packet checksum on the IP and Ethernet layer, and puts the new checksum in place in the test packet, and then forwards 3:6 the packet to the virtual machine 321.

The test application 322 of the second virtual machine 321 first inserts 3:7 one virtual machine time stamp T2 in the packet and then inserts 3:8 a further virtual machine time stamp T3. Then the virtual machine 321 transmits or reflects 3:9 the packet back towards the virtual machine 311 of the physical machine 1 from which the packet was received. The hypervisor 323 of the second physical machine 2 320 intercepts the packet and inserts 3:10 a further hypervisor time stamp HT3 into the packet, recalculates the packet checksum on the IP and Ethernet layer, and puts the new checksum in place in the test packet before reflecting 3:11 the test packet back to the virtual machine 311. The packet travels over the network and reaches the first physical machine 310, where the hypervisor 313 of the first physical machine 310 intercepts the test packet and inserts 3:12 a further hypervisor time stamp HT4 into the packet. The hypervisor further recalculates the packet checksum on the IP and Ethernet layer, and puts the new checksum in place in the test packet Thereafter, the hypervisor 313 of the first physical machine 310 forwards 3:13 the test packet to the virtual machine 311, wherein the test application 312 generates 3:14 a virtual machine time stamp T4 for the test packet. It shall be pointed out that before the packet is reflected, the peer node may create a new packet and copy the time stamps of the received packet into the new created packet so that the physical machine will receive a packet comprising all relevant time stamps. Alternatively, the peer node may create a new header and add this header to the packet before reflecting the packet back to the physical machine. The header of the packet will comprise address information of at least the destination, thus either a new packet should be created or a new header should be added to the received packet.

This enables the test application 312 of the first physical machine to analyse the test packet together with the last generated virtual machine time stamp T4. It is possible to determine, by comparing the different time stamps, the time passed between T1 and HT1, which is the time passed from the creation and initialisation of the packet until it is transmitted from the first physical machine 310 towards the second physical machine. It is possible to determine the time passed between HT1 and HT2, which is the time passed during the packet travelling through the network from the first physical machine 310 to the second physical machine 320. It is further possible to determine the time passed for the packet within the second physical machine 320 and in the network on its way back to the first physical machine 310.

Figure 3B:
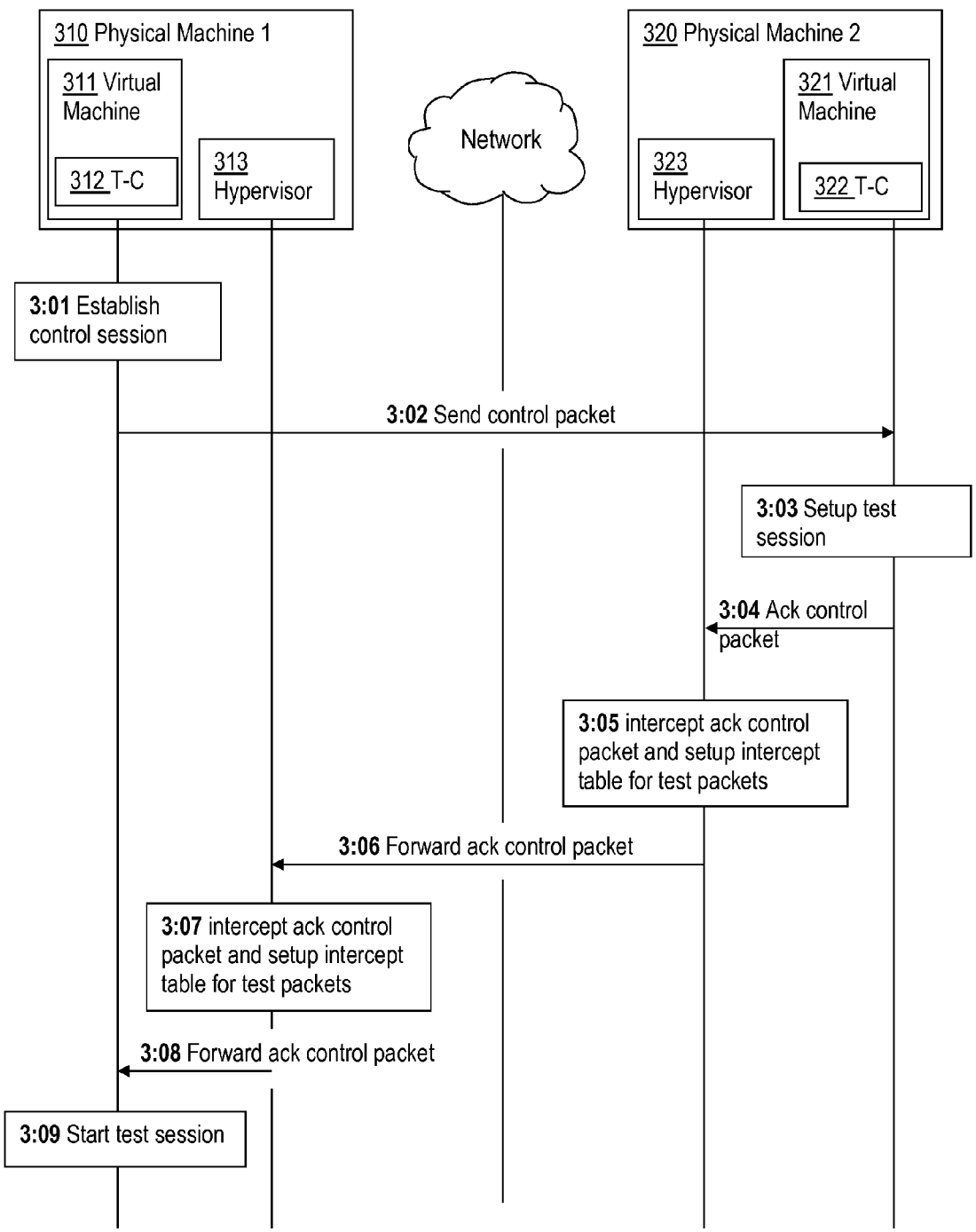
FIG. 3b is a signalling diagram exemplifying a test session between a first and a second physical machine taking place before a performance measurement between the first and the second physical machine.

FIG. 3b is a signalling diagram exemplifying a test session between the first and the second physical machine taking place before a performance measurement between the first and the second physical machine.

Before a performance measurement takes place, a control session may be performed between the first and the second physical machine. The exemplifying test session in FIG. 3b comprises the test application 312 of the virtual machine 311 establishing 3:01 a control session. The control session provides information about the address and port numbers of the test traffic, or performance measurement, to come. This may comprise creating a control packet which may be used e.g. to discover if there are any hypervisors in the signalling path or chain. The virtual machine 311 of the first physical machine then transmits 3:02 the control packet towards the virtual machine 321 of the second physical machine 320. This packet is illustrated as passing transparently through the hypervisor 313, illustrating an example of when a packet may be of a certain protocol which may be time stamped, but due to a criterion the control packet is not time stamped by the hypervisor 313. The packet reaches the second physical machine 320 and passes the hypervisor 323 transparently and is delivered to the virtual machine 321 associated with the second physical machine 320. The virtual machine 321 associated with the second physical machine 320 3:03 sets up a test session and transmits 3:04 an acknowledgement control packet towards the virtual machine 311 of the first physical machine 310. This acknowledgement control packet is intercepted 3:05 by the hypervisor 323 of the second physical machine 320 and the hypervisor 323 sets up an intercept table for test packets. The hypervisor 323 also inserts a mark into the acknowledgement control packet so that the test application 312 of the virtual machine 311 of the first physical machine 310 is informed that the second physical machine 321 comprises a hypervisor. Then the hypervisor 323 forwards 3:06 the acknowledgement control packet towards the virtual machine 311 of the first physical machine 310. The acknowledgement control packet reaches the first physical machine 310 and is intercepted 3:07 by the hypervisor 313 of the first physical machine 310. The hypervisor 313 of the first physical machine 310 sets up an intercept table for test packets, inserts a mark into the acknowledgement control packet so that the test application 312 of the virtual machine 311 of the first physical machine 310 is informed of the hypervisor 311 of the first physical machine 310. Then the hypervisor 313 forwards 3:08 the acknowledgement control packet to the test application 312 of the virtual machine 311 and the test application 312 may then start 3:09 a test session, i.e. a performance measurement.

Embodiments herein also relate to a hypervisor associated with a virtual machine, adapted for enabling a performance measurement between the virtual machine and a peer node. The hypervisor has the same technical features, objects and advantages as the method performed by the hypervisor described above. The hypervisor will only be described in brief in order to avoid unnecessary repetition.

Figure 4A:
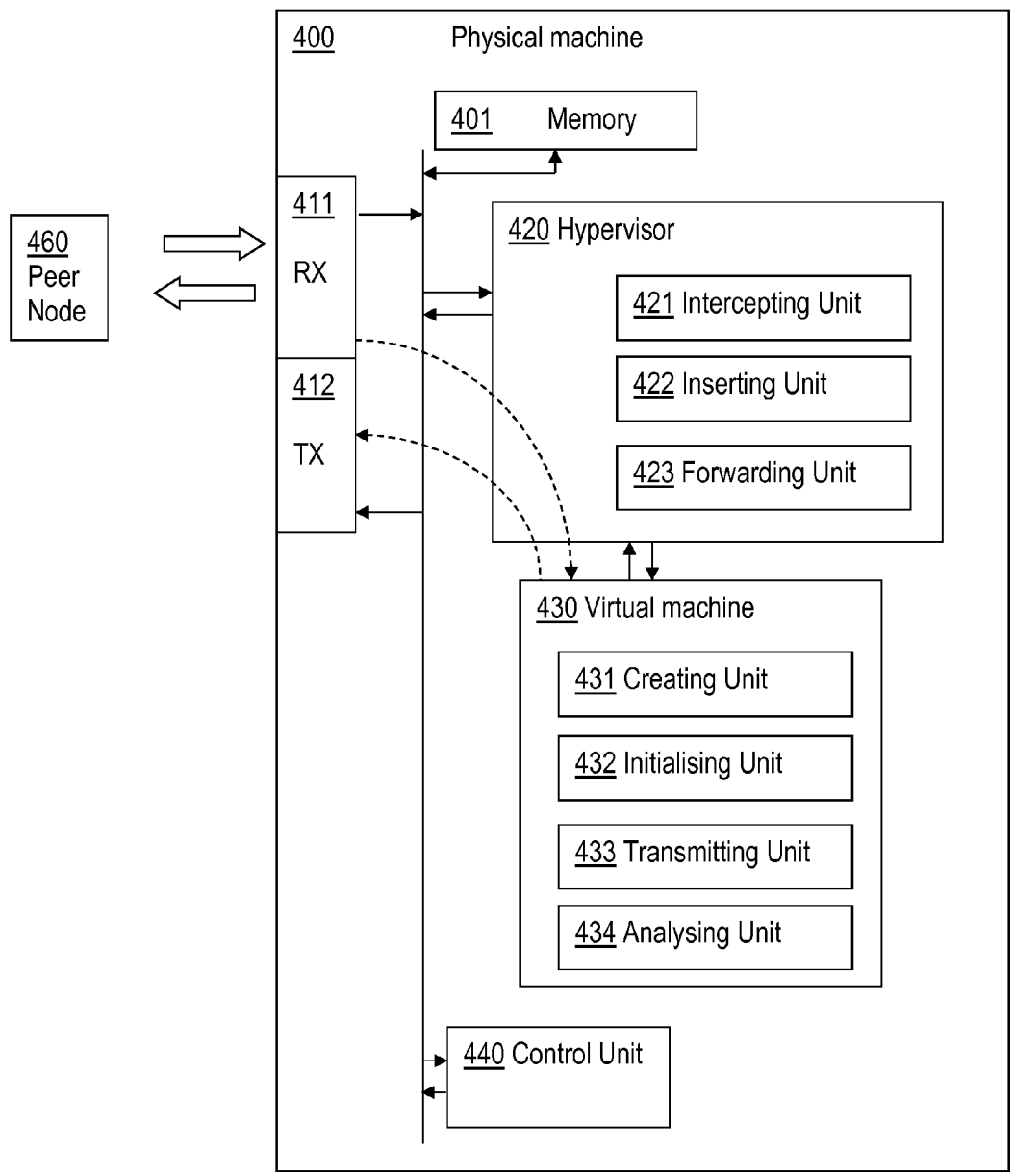
FIG. 4a is a block diagram of an exemplifying embodiment of a physical machine, a hypervisor and a virtual machine.

Such a hypervisor will be briefly described with reference to FIG. 4a. The hypervisor 420 is associated with the virtual machine 430 and is adapted for enabling a performance measurement between the virtual machine 430 and a peer node 460. FIG. 4a illustrates the hypervisor comprising an intercepting unit 421 adapted for intercepting a packet transmitted from, or destined to, the virtual machine 430, the packet comprising a destination address to the virtual machine 430 or to the peer node 460, and determining whether to insert a hypervisor time stamp or not in the packet. The hypervisor also comprises an inserting unit 422 adapted for, when it is determined to insert the hypervisor time stamp in the packet, inserting a hypervisor time stamp in the packet; and a forwarding unit 423 adapted for forwarding the packet to its destination according to the destination address.

The hypervisor has the same advantages as the method performed by the hypervisor. One advantage is that it is possible to extract more information from the test packet once the packet has traveled its course. The hypervisor time stamp(s) enables localisation of possible performance degradation from end-to-end active measurements using standardised protocols, the degradation may either be due to the virtualisation or due to the network interconnecting the physical machine (on which the virtual machine is running) and the peer node. Another advantage is that the method may provide functionality for system diagnoses, e.g. if a possible problem is due to the virtualisation on a specific hardware of the physical machine or due to the network. Still an advantage is that there is no impact on the virtual machine, only in the hypervisor which is transparent to the virtual machine.

Still further, the method may enable a user of a Cloud (or virtual machine) to study performance of the hypervisor and measure SLAs.

According to an embodiment, the inserting unit 422 is adapted for determining whether to insert the hypervisor time stamp or not in the packet based on properties of the packet such as address and port number.

According to still an embodiment, the inserting unit 422 is adapted for determining whether to insert the hypervisor time stamp or not in the packet based on the packet being of a predetermined protocol.

According to yet an embodiment, when the packet is of a TWAMP or an ICMP, then the hypervisor is adapted to insert a hypervisor time stamp into the packet.

Embodiments herein also relate to a physical machine comprising at least one hypervisor executing at least one virtual machine as described above, adapted for performing a performance measurement between the virtual machine and a peer node when the virtual machine is the initiator of the measurement between the virtual machine and the peer node. The physical machine has the same technical features, objects and advantages as the method performed by the physical machine described above. The physical machine will only be described in brief in order to avoid unnecessary repetition.

Such a physical machine will be briefly described also with reference to FIG. 4a. FIG. 4a illustrates the physical machine 400 comprising the virtual machine 430 comprising a creating unit 431 adapted for creating the packet which is to be transmitted to the peer node 460, wherein the virtual machine 430 further comprises an initialising unit 432 adapted for initialising the packet by inserting a first virtual machine time stamp in the packet, and a transmitting unit 433 adapted for transmitting the packet towards the peer node 460. The physical machine further comprises the hypervisor 420 comprising the intercepting unit 421 adapted for intercepting the packet transmitted from the virtual machine 430, the inserting unit 422 adapted for inserting a first hypervisor time stamp in the packet, the forwarding unit 423 adapted for forwarding the packet towards the peer node 460, wherein the intercepting unit 421 further is adapted for intercepting the packet when it is transmitted back to the virtual machine 430 from the peer node, the inserting unit 422 further is adapted for inserting a further hypervisor time stamp in the packet, and the forwarding unit 423 further is adapted for forwarding the packet to the virtual machine 430. The initialising unit 432 of the virtual machine 430 further is adapted for generating a last virtual machine time stamp.

The physical machine has the same advantages as the method performed by the physical machine. One advantage is that it is possible to extract more information from the test packet once the packet has traveled its course. The hypervisor time stamp(s) enables localisation of possible performance degradation from end-to-end active measurements using standardised protocols, the degradation may either be due to the virtualisation or due to the network interconnecting the physical machine (on which the virtual machine is running) and the peer node. Another advantage is that the method may provide functionality for system diagnoses, e.g. if a possible problem is due to the virtualisation on a specific hardware of the physical machine or due to the network. Still an advantage is that there is no impact on the virtual machine, only in the hypervisor which is transparent to the virtual machine. Still further, the method may enable a user of a Cloud (or virtual machine) to study performance of the hypervisor and measure SLAs.

According to an embodiment, the creating unit 431 of the virtual machine 430 further is adapted for determining the number of hypervisors of the physical machine 400 on which the virtual machine 430 is running and the number of hypervisors of the peer node 460 and defining two hypervisor time stamp fields per hypervisor when creating the packet.

According to still an embodiment, the virtual machine further comprises an analysing unit 434 adapted for analysing the packet based on the virtual machine time stamps, the hypervisor time stamps comprised in the packet and the generated last virtual machine time stamp.

According to still an embodiment, the virtual machine creating the packet comprises an application executed by the virtual machine creating the packet which is to be transmitted to the peer node.

Embodiments herein also relate to a physical machine comprising at least one hypervisor executing at least one virtual machine as described above adapted for performing a performance measurement between the virtual machine and a peer node when the peer node is the initiator of the measurement between the virtual machine and the peer node. The physical machine has the same technical features, objects and advantages as the method performed by the physical machine described above. The physical machine will only be described in brief in order to avoid unnecessary repetition.

Such a physical machine will be briefly described also with reference to FIG. 4a. FIG. 4a illustrates the physical machine 400 comprising the hypervisor 420 comprising the intercepting unit 421 adapted for intercepting the packet destined to the virtual machine 430, the inserting unit 422 adapted for inserting the hypervisor time stamp in the packet, and the forwarding unit 423 adapted for forwarding the packet to the virtual machine 430. The physical machine 400 also comprises the virtual machine comprising the initialising unit 432 adapted for inserting a virtual machine time stamp in the packet, the initialising unit 432 adapted for inserting a further virtual machine time stamp in the packet, the transmitting unit 433 adapted for transmitting the packet back towards the peer node 460 from which it was received. The intercepting unit 421 of the hypervisor 420 is adapted for intercepting the packet destined to the peer node, and the inserting unit 422 is adapted for inserting a further hypervisor time stamp in the packet, and the forwarding unit 423 is adapted for forwarding the packet towards the peer node 460.

The physical machine has the same advantages as the method performed by the physical machine. One advantage is that it is possible to extract more information from the test packet once the packet has travelled its course. The hypervisor time stamp(s) enables localisation of possible performance degradation from end-to-end active measurements using standardised protocols, the degradation may either be due to the virtualisation or due to the network interconnecting the physical machine (on which the virtual machine is running) and the peer node. Another advantage is that the method may provide functionality for system diagnoses, e.g. if a possible problem is due to the virtualisation on a specific hardware of the physical machine or due to the network. Still an advantage is that there is no impact on the virtual machine, only in the hypervisor which is transparent to the virtual machine. Still further, the method may enable a user of a Cloud (or virtual machine) to study performance of the hypervisor and measure SLAs.

According to an embodiment, the virtual machine inserting 231 the virtual machine time stamp in the packet comprises an application executed by the virtual machine inserting the virtual machine time stamp in the packet.

Figure 4B:
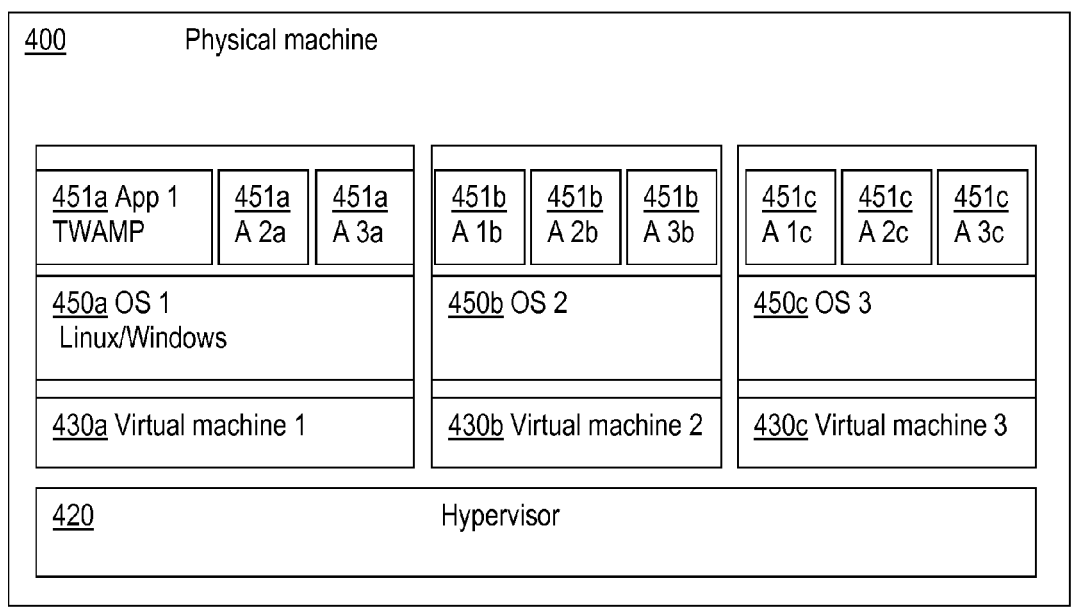
FIG. 4b is a block diagram of another exemplifying embodiment of a physical machine, a hypervisor and a virtual machine.

FIG. 4b is a block diagram of another exemplifying embodiment of a physical machine, a hypervisor and a virtual machine.

FIG. 4b illustrates the physical machine 400 running one hypervisor 420 on hardware of the physical machine. The hypervisor 420 executes three virtual machines 430a, 430b and 430c. It shall be pointed out that this is merely an example, and the hypervisor may execute fewer or more virtual machines. Each virtual machine executes an Operation System, OS, 450a, 450b and 450c. There are different OSs available, e.g. Linux, Windows, OS X Mountain Lion and so on. On the OS 450a, 450b and 450c, different applications or programs 451a 451b and 451c may be run and in the example in FIG. 4b, the first virtual machine executes three different applications or programs, whereof one is TWAMP.

Figure 4C:
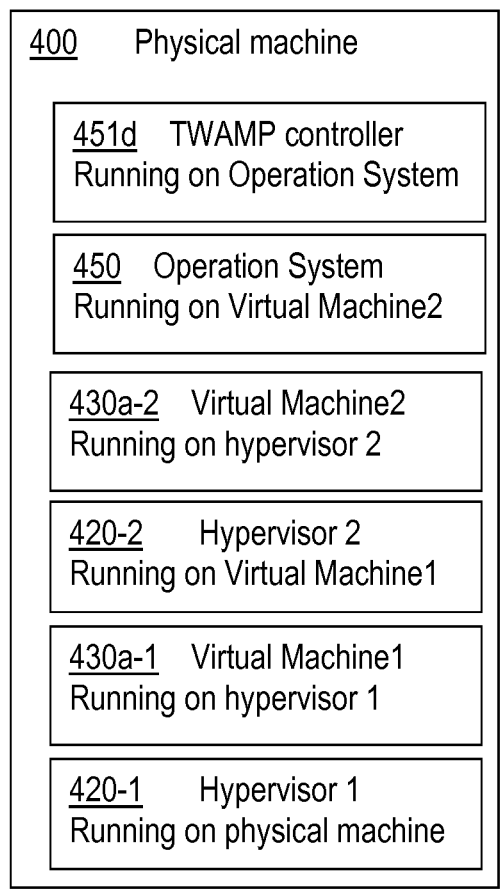
FIG. 4c is a block diagram of still another exemplifying embodiment of one physical machine, hypervisors and virtual machines.

FIG. 4c is a block diagram of still another exemplifying embodiment of one physical machine, hypervisors and virtual machines.

First, a hypervisor 1 denoted 420-1 is running on the physical machine 400. The first hypervisor 420-1 executes a first virtual machine 430a-1. The first virtual machine 430a-1 in turn runs a hypervisor called hypervisor 2 and denoted 420-2. On this hypervisor 2, a second virtual machine is running or being executed, the second virtual machine being denoted 430a-2. On the second virtual machine denoted 430a-2, an OS 450 is being executed and the OS 450 executes, in turn, a TWAMP controller or application 451d. In this manner, a physical machine may comprise a hierarchy of hypervisors. A hypervisor hierarchy can reside either at the initiator node, reflector node or both.

Figure 4D:
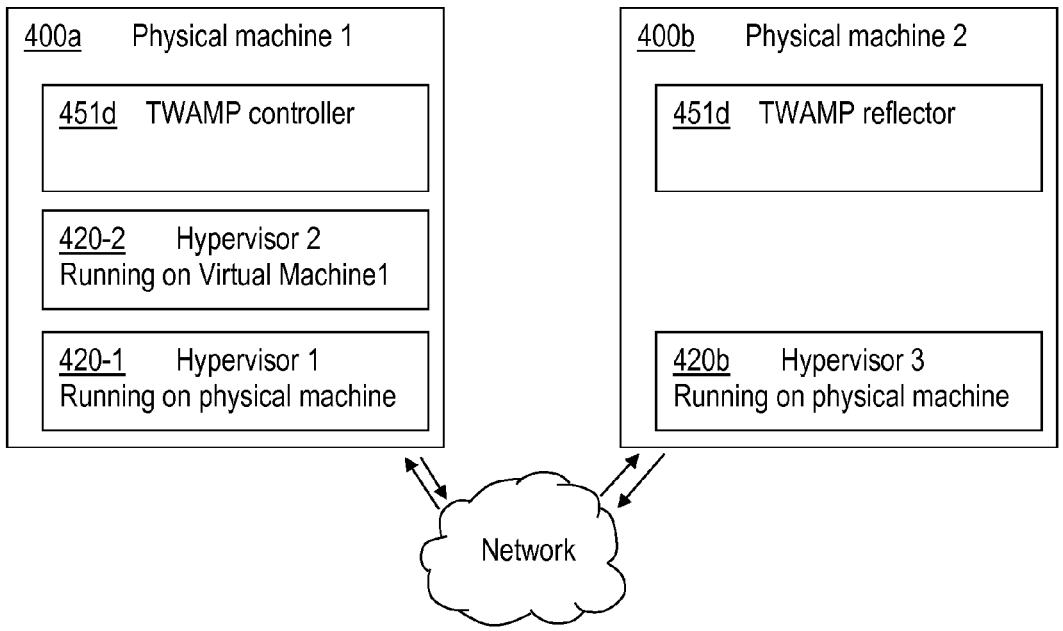
FIG. 4d is a block diagram of different hypervisor time stamps in two physical machines, due to hierarchical architecture of hypervisors.

FIG. 4d is a block diagram of different hypervisor time stamps in two physical machines, due to hierarchical architecture of hypervisors.

In this example, the hypervisors are configured to add time stamps in a stacked fashion. That is, they add a time stamp on the next empty slot in the measurement packet (e.g. in the packet padding for the TWAMP case). An empty slot is determined as the next unused, or zero, field in the test packet. That is, the measurement packet will have a stack of time stamps added at the three different hypervisors. If the test application (or other entity) knows the scenario (i.e. what is shown in FIG. 4b) it is easily deduced which time stamp belongs to which hypervisor.

The first physical machine 400a runs a first hypervisor 420-1, which executes a virtual machine (not shown), which in turn executes a second hypervisor 420-2. The second hypervisor 420-2 executes a second virtual machine (not shown), which in turn executes a test application, e.g. a TWAMP application 451d acting as the initiator/controller. The TWAMP application 451d of the first physical machine 400a initiates a performance measurement and creates a test packet, which is transmitted to the second physical machine 400b. The second hypervisor 420-2 intercepts the test package, inserts a first hypervisor time stamp and forwards the packet towards the second physical machine 400b, which runs a hypervisor 420b, which in turn runs a TWAMP controller/application 451d acting as a reflector. The first hypervisor 420-1 intercepts the test package, inserts a second hypervisor time stamp into the packet and forwards the packet towards the second physical machine 400b.

When received at the second physical machine 400b, its hypervisor 420b intercepts the packet and inserts a third hypervisor time stamp into the packet before forwarding the packet to the TWAMP application acting as reflector. When the TWAMP application acting as reflector returns the packet towards the second virtual machine of the first physical machine, the hypervisor 420b of the second physical machine 400b intercepts the packet and inserts a fourth hypervisor time stamp into the packet before forwarding the packet back to the second virtual machine of the first physical machine. When the packet is received at the first physical machine 400a, the first hypervisor 420-1 intercepts the packet and inserts a fifth hypervisor time stamp into the packet and forwards the packet towards the second virtual machine. The second hypervisor 420-2 intercepts the packet and inserts a sixth hypervisor time stamp into the packet and forwards the packet towards the TWAMP application acting as initiator/controller. It shall be noted that this is a simplified example only illustrating the hypervisor time stamps and the virtual machine time stamps have been omitted.

In FIG. 4a, the physical machine 400 is also illustrated comprising a receiving unit 411 and a transmitting unit 412. Through these two units, the physical machine 400 is adapted to communicate with other nodes and/or entities in the communication network. The receiving unit 411 may comprise more than one receiving arrangement. For example, the receiving unit may be connected to both a wire and an antenna, by means of which the physical machine 400 is enabled to communicate with other nodes and/or entities in the communication network. Similarly, the transmitting unit 412 may comprise more than one transmitting arrangement, which in turn are connected to both a wire and an antenna, by means of which the physical machine 400 is enabled to communicate with other nodes and/or entities in the communication network. The physical machine 400 further comprises a memory 401 for storing data. Further, the physical machine 400 is illustrated comprising a control or processing unit 440 which in turns is connected to the different units 420 and 430. It shall be pointed out that this is merely an illustrative example and the physical machine 400 may comprise more, less or other units or modules which execute the functions of the physical machine 400 in the same manner as the units illustrated in FIG. 4a.

It should be noted that FIG. 4a merely illustrates various functional units in the physical machine 400 in a logical sense. The functions in practice may be implemented using any suitable software and hardware means/circuits etc. Thus, the embodiments are generally not limited to the shown structures of the physical machine 400 and the functional units. Hence, the previously described exemplary embodiments may be realised in many ways. For example, one embodiment includes a computer-readable medium having instructions stored thereon that are executable by the control or processing unit 440 for executing the method steps in the physical machine 400. The instructions executable by the computing system and stored on the computer-readable medium perform the method steps of the physical machine 400 as set forth in the claims.

FIG. 4a further schematically illustrates that a virtual machine being executed by a hypervisor of the physical machine is enabled to communicate with other nodes and/or entities in the communication network by means of the receiving unit 411 and the transmitting unit 412. The communication via the receiving unit 411 and the transmitting unit 412 is illustrated going via the hypervisor by the dotted lines. It shall be pointed out that this is merely a logical and simplified illustration.

Figure 5:
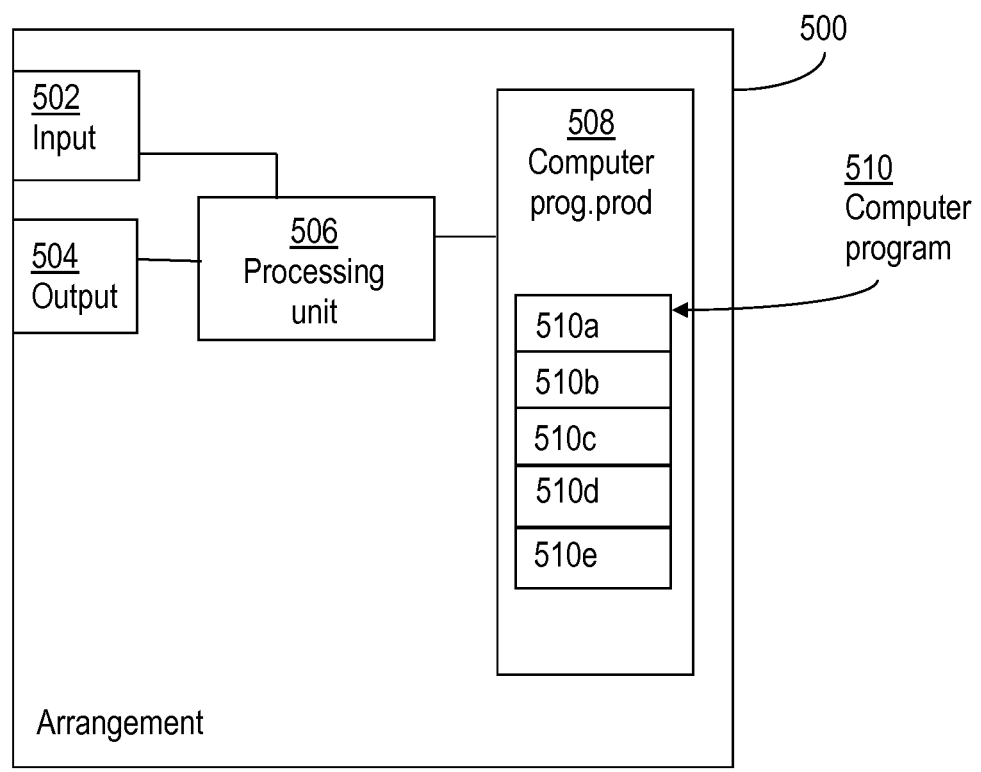
FIG. 5 is a block diagram of an exemplifying arrangement of a hypervisor.

FIG. 5 schematically shows an embodiment of an exemplifying arrangement of a hypervisor 500. Comprised in the hypervisor 500 are here a processing unit 506, e.g. with a DSP (Digital Signal Processor). The processing unit 506 may be a single unit or a plurality of units to perform different actions of procedures described herein. The hypervisor 500 may also comprise an input unit 502 for receiving signals from other entities, and an output unit 504 for providing signal(s) to other entities. The input unit and the output unit may be arranged as an integrated entity or as illustrated in the example of FIG. 4a, as one or more interfaces 411/412.

Furthermore, the hypervisor 500 comprises at least one computer program product 508 in the form of a non-volatile memory, e.g. an EEPROM (Electrically Erasable Programmable Read-Only Memory), a flash memory and a hard drive. The computer program product 508 comprises a computer program 510, which comprises code means, which when executed in the processing unit 506 in the hypervisor 500 causes the hypervisor to perform the actions e.g. of the procedure described earlier in conjunction with FIG. 1.

The computer program 510 may be configured as a computer program code structured in computer program modules 510a-510e. Hence, in an exemplifying embodiment, the code means in the computer program of the hypervisor 500 comprises an intercepting unit, or module, for intercepting a packet transmitted from, or destined to, the virtual machine, the packet comprising a destination address to the virtual machine or to the peer node, and determining whether to insert a hypervisor time stamp or not in the packet. When it is determined to insert the hypervisor time stamp in the packet, intercepting unit, or module, inserts a hypervisor time stamp in the packet. The computer program further comprises a forwarding unit, or module, for forwarding the packet to its destination according to the destination address.

The computer program modules could essentially perform the actions of the flow illustrated in FIG. 1, to emulate the hypervisor 500. In other words, when the different computer program modules are executed in the processing unit 506, they may correspond to the units 421-423 of FIG. 4a.

Figure 6:
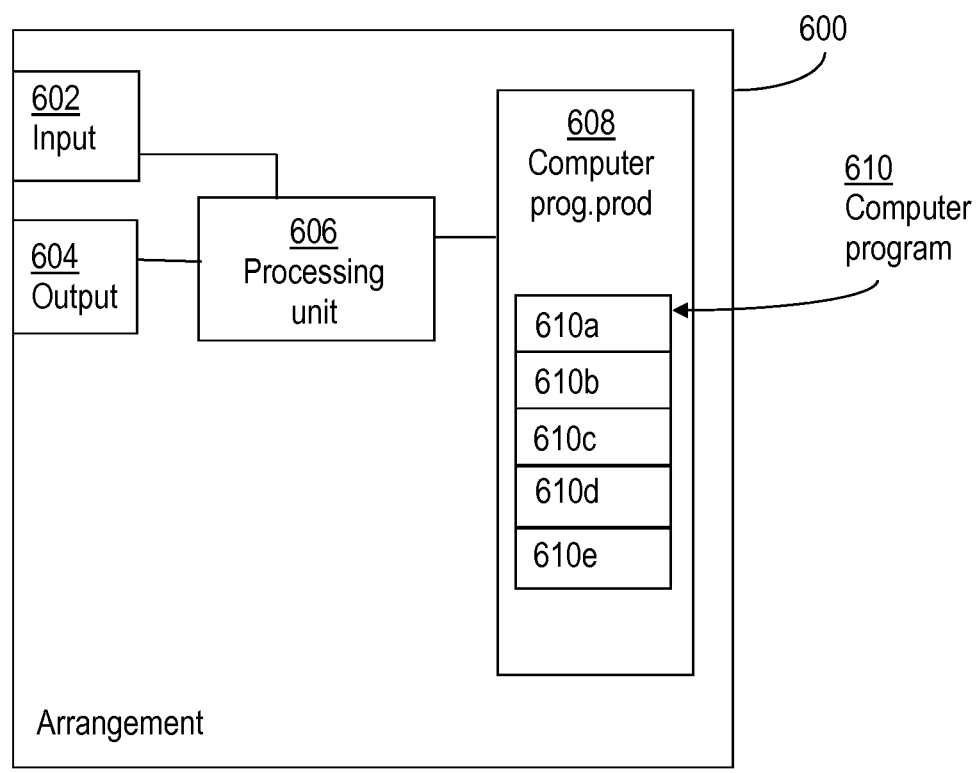
FIG. 6 is a block diagram of an exemplifying arrangement of a physical machine.

FIG. 6 schematically shows an embodiment of a physical machine 600. Comprised in the physical machine 600 are here a processing unit 606, e.g. with a DSP (Digital Signal Processor). The processing unit 606 may be a single unit or a plurality of units to perform different actions of procedures described herein. The physical machine 600 may also comprise an input unit 602 for receiving signals from other entities, and an output unit 604 for providing signal(s) to other entities. The input unit and the output unit may be arranged as an integrated entity or as illustrated in the example of FIG. 4a, as one or more interfaces 411/412.

Furthermore, the physical machine 600 comprises at least one computer program product 608 in the form of a non-volatile memory, e.g. an EEPROM (Electrically Erasable Programmable Read-Only Memory), a flash memory and a hard drive. The computer program product 608 comprises a computer program 610, which comprises code means, which when executed in the processing unit 606 in the physical machine 600 causes the physical machine 600 to perform the actions e.g. of the procedure described earlier in conjunction with FIGS. 2a and 2b.

The computer program 610 may be configured as a computer program code structured in computer program modules 610a-610e. Hence, in an exemplifying embodiment, the code means in the computer program of the physical machine 600 comprises a virtual machine comprising a creating unit or module for creating the packet which is to be transmitted to the peer node, wherein the virtual machine further comprises an initialising unit or module for initialising the packet by inserting a first virtual machine time stamp in the packet, and a transmitting unit or module for transmitting the packet towards the peer node. The computer program further comprises the hypervisor comprising the intercepting unit or module for intercepting the packet transmitted from the virtual machine, and the inserting unit or module for inserting a first hypervisor time stamp in the packet. The hypervisor also comprises the forwarding unit or module for forwarding the packet towards the peer node, wherein the intercepting unit or module further intercepts the packet when it is transmitted back to the virtual machine from the peer node. The inserting unit inserts a further hypervisor time stamp in the packet, and the forwarding unit or module further forwards the packet to the virtual machine. The initialising unit of module of the virtual machine further generates a last virtual machine time stamp.

In an exemplifying embodiment, the code means in the computer program of the physical machine 600 comprises the hypervisor comprising the intercepting unit or module for intercepting the packet destined to the virtual machine, the inserting unit or module for inserting the hypervisor time stamp in the packet, and the forwarding unit or module for forwarding the packet to the virtual machine. The physical machine 400 also comprises the virtual machine comprising the initialising unit or module for inserting a virtual machine time stamp in the packet, the initialising unit or module for inserting a further virtual machine time stamp in the packet, the transmitting unit or module for transmitting the packet back towards the peer node from which it was received. The intercepting unit or module of the hypervisor 420 further intercepts the packet destined to the peer node, and the inserting unit or module inserts a further hypervisor time stamp in the packet, and the forwarding unit further forwards the packet towards the peer node.

The computer program modules could essentially perform the actions of the flow illustrated in FIGS. 2a and 2b, to emulate the physical machine 600. In other words, when the different computer program modules are executed in the processing unit 606, they may correspond to the units 421-423 and 431-433 of FIG. 4a.

Although the code means in the respective embodiments disclosed above in conjunction with FIG. 4a are implemented as computer program modules which when executed in the respective processing unit causes the hypervisor and the physical machine respectively to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the hypervisor and the physical machine respectively.

FIG. 7a is a block diagram an exemplifying test packet format based on TWAMP. As described above, different test protocols may be used whereof one example is TWAMP.

An initiator, also called a controller, sends a control packet to the reflector to setup a measurement session. The parameters include for example number of test packets to be exchanged, sender and receiver IP, sender and receiver port numbers and start time. The requested measurement session is acknowledged by the reflector. See also FIGS. 3a and 3b.

When the measurement session is established the test packets are sent from the initiator/controller, to the reflector and back again using the agreed parameters. According to the TWAMP architecture each packet is time stamped 4 times corresponding to steps 3:1, 3:7, 3:8 and 3:14 in FIG. 3a. From this it is possible to calculate forward and reverse one-way delay, jitter and also round-trip time.

In order for the test packet to also carry the hypervisor time stamps corresponding to steps 3:3, 3:5, 3.10 and 3:12, the TWAMP protocol may be extended so that e.g. additional fields are defined in padding octets. An example of added fields in a TWAMP packet is illustrated in FIG. 7a by the four additional fields 706, 707, 708 and 7009, i.e. hypervisor time stamp 1, HT1, hypervisor time stamp 2, HT2, hypervisor time stamp 3, HT3 and hypervisor time stamp 4, HT4.

Figure 7B:
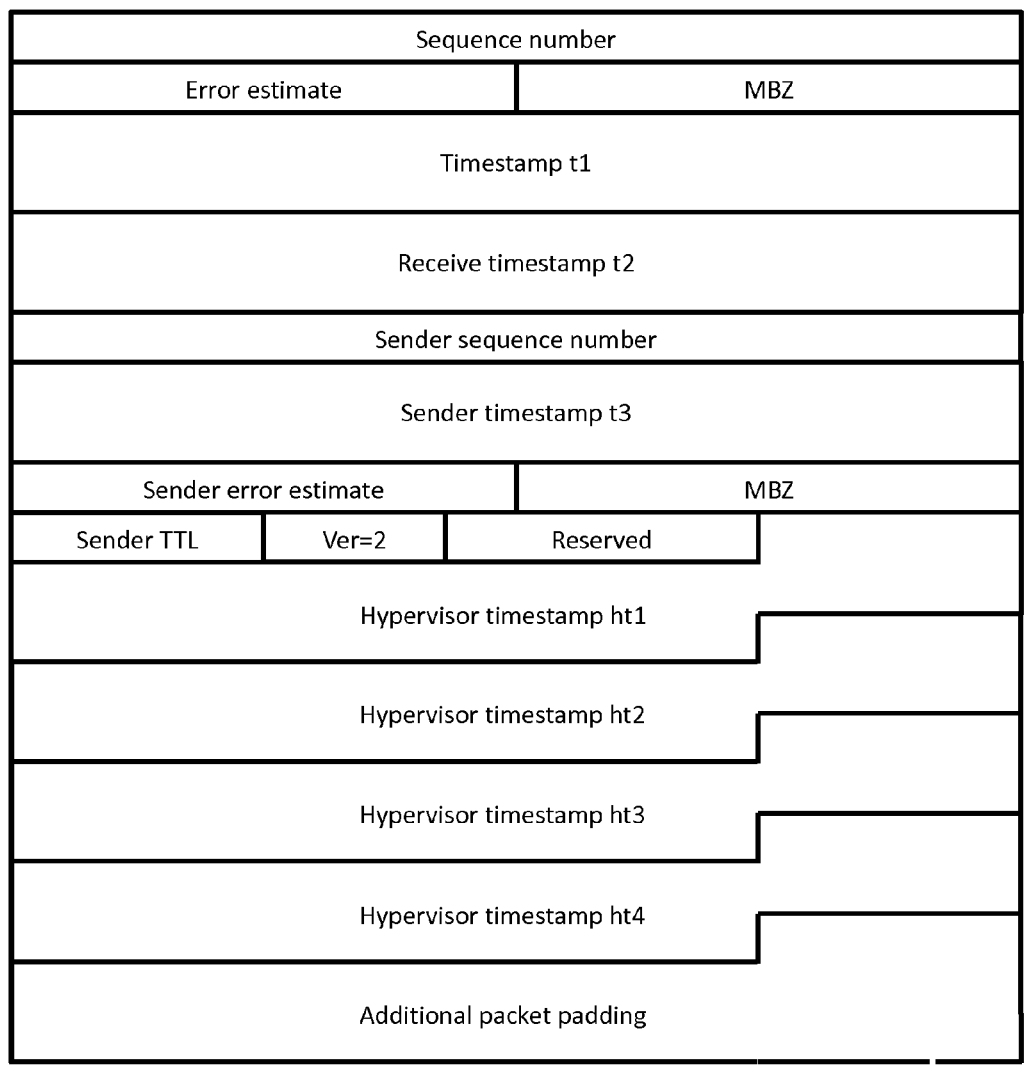
FIG. 7b is a block diagram another exemplifying test packet format based on TWAMP.

An example of unauthenticated mode of the TWAMP test packet may have the format in the reverse direction as illustrated in FIG. 7b.

Again it shall be noted that these are merely examples and other protocols for active measurements may be extended in a similar way as TWAMP described above.

When the initiating party, TWAMP controller/initiator, initialises the packet, the TWAMP controller/initiator sets all time stamp fields to zero. Hence, in case a hypervisor is not able to add a time stamp in a certain field, this is easily detected since such a field comprises just zero.

The TWAMP protocol should thus be updated to define the new time stamp fields in a test packet to enable a hypervisor to intercept the test packet and insert a hypervisor time stamp into it.

The initiating party of a performance measurement may first signal or configure the TWAMP session, e.g. similar to what is shown in FIG. 3b. The control packet may comprise information indicating which version of the TWAMP will be used by the TWAMP initiator/controller. The peer node, or TWAMP reflector, is then enabled to deduce which version of the TWAMP that will be used for the performance measurement. If the peer node comprise a hypervisor and the new TWAMP version is used then the hypervisors of both parties may insert hypervisor time stamps into the test packet. In case only the physical machine on which the TWAMP initiator/controller is running (by means of a hypervisor and virtual machine as described above) comprises a hypervisor and not the peer node, then the test packet may either be created with hypervisor time stamp fields for the hypervisor(s) of the physical machine, or any hypervisor time stamp fields of the test packet intended for a hypervisor of the peer node will be set to zero by the initiator. If the peer node does not run a hypervisor, then any hypervisor time stamp fields intended for a possible hypervisor at the peer node will be left as they were when the peer node received the packet, i.e. those fields will still have zeros when the test packet is returned to the physical machine on which the TWAMP initiator/controller is running.

Likewise, if the TWAMP initiator/controller is simply running on a physical machine and the peer node runs a hypervisor, which in turn executes a virtual machine executing a TWAMP reflector, the TWAMP initiator/controller may still support the new updated TWAMP, but any hypervisor time stamp field intended for a possible hypervisor of the physical machine on which the TWAMP initiator/controller is running will be left with zeros since there is no hypervisor running on the physical machine, which runs a virtual machine, executing the TWAMP controller/initiator. However, any hypervisor of the peer node may insert hypervisor time stamp into fields intended for hypervisor(s) of the peer node.

The test session described in FIG. 3b may inform the TWAMP initiator/controller 312 of the hypervisors running on the first and the second physical machine 310 and 320, or the TWAMP initiator/controller 312 may simply create a test packet for performing the performance measurement which is large enough, i.e. has sufficiently many hypervisor time stamp fields, to accommodate hypervisor time stamps of any number of hypervisors running on the first and the second physical machine 310 and 320. Any superfluous hypervisor time stamp field not used will comprise only zeros after the test packet has been transmitted to and received back from the peer node. This is because all hypervisor time stamp fields are set to, or filled with, zeros when the TWAMP initiator/controller initiates the test packet before transmitting it towards the peer node.

As described above with reference to FIG. 3b, before a hypervisor can intercept test packets and possibly insert a hypervisor time stamp into a dedicated field in the test packet for measurements, the hypervisor must first intercept control packets being sent between the TWAMP initiator/controller and the TWAMP reflector. The control packets contain session parameters such as sender IP, receiver IP, sender port and receiver port. The control also communicates the TWAMP mode which specifies the TWAMP test packet format or TWAMP version number.

The intercepting of control packets may be performed by listening on TWAMP control packets with the new mode for, or version of, the TWAMP. The control packets are usually sent towards a well-known IP port number. That is, intercepting these packets is easy and does not require much processing power.

In an example, when the setup phase for a TWAMP session is identified, the hypervisor adds this session to an internal database for intercepting of the test packets. Intercepting is e.g. based on the 4-tuple <sender IP, receiver IP, sender port, receiver port>. The hypervisor must by some means know where in the test packet to put the timestamp, i.e. where in the packet the hypervisor time stamp fields are located. This is in one example pre-configured.

Instead of intercepting the control packets for establishing TWAMP test sessions, in one example, only intercept test packets being sent and received on pre-defined port numbers are intercepted. This has to be configured in advance and put into a test packet intercepting database. Again the intercepting may be based on the 4-tuple <sender IP, receiver IP, sender port, receiver port>. This solution is more "lightweight" since it does not require inspection of all TWAMP control packets on the network. Further, this solution supports a TWAMP light mode.

After establishing the test packet intercepting database the hypervisor intercepts the TWAMP test packets. This is illustrated in FIG. 3a and described above. As illustrated by FIGS. 7a and 7b, the forward and reverse TWAMP header of the test packet may be different.

When the TWAMP initiator/controller receives the test packet back from the peer node, the TWAMP initiator/controller is enabled to calculate different metrics as described above. E.g. the total round-trip time is estimated as T4-T1, the one-way delay in the forward direction is calculated as T2-T1, the one-way delay in the reverse direction is calculated as T4-T3. The TWAMP initiator/controller is further enabled to calculate the following metrics: delay in machine 1 due to virtualization in the forward direction is calculated as HT1-T1, delay in machine 2 due to virtualization in the forward direction is calculated as T2-HT2, delay in machine 2 due to virtualization in the reverse direction is calculated as HT3-T3, and delay in machine 1 due to virtualization in the reverse direction is calculated as T4-HT4.

This allows for determining the delay due to virtualization and the delay due to networking issues. This is important for localizing a performance issue. Of course, other metrics may be calculated using their own estimation methodology using the additional hypervisor time stamps.

Instead of using TWAMP for the performance measurement, ICMP may be used as described briefly above. There are different ICMP control messages. For example, ICMP echo request has type 8 whereas ICMP echo reply has type 0. ICMP type 13 refers to the time stamp message and type 14 to timestamp reply message. This is traditionally used for synchronization of time between nodes. Updating the ICMP by adding the hypervisor timestamps to the type 13 message structure results in a test packet illustrated in FIGS. 8a and 8b for the forward and reverse direction.

Each time stamp corresponds to the time stamp described in the TWAMP embodiment (i.e. T1-T4 and HT1-HT4). Observe that time stamps in ICMP timestamp is 32 bits while the TWAMP timestamps are 64 bits. Code 0 is reserved for the original ICMP timestamp functionality. For the new hypervisor time stamping functionality a new code should be reserved. ICMP intercepting in the hypervisor is performed in a similar way as for TWAMP intercepting. All ICMP packets with type 13 or 14 and the new code for hypervisor time stamping are snooped. There is no control protocol for setting up the ICMP timestamp protocol, so it functions much like TWAMP light. The hypervisor should by some means know where in the test packet to put the timestamp. This could be pre-configured.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method implemented by a physical machine for performing a performance measurement between a virtual machine and a peer node when the virtual machine is the initiator of the measurement between the virtual machine and the peer node, the physical machine comprising a hypervisor and the virtual machine, the method comprising:

creating, by the virtual machine, a packet which is to be transmitted to the peer node;

initializing, by the virtual machine, the packet by inserting a first virtual machine time stamp in the packet; and, transmitting, by the virtual machine, the packet towards the peer node;

intercepting, at the hypervisor, the packet transmitted from the virtual machine and the packet comprising a destination address to the peer node;

determining, at the hypervisor, whether to insert a hypervisor time stamp or not in the packet;

based on the determination to insert the hypervisor time stamp in the packet, inserting, at the hypervisor, the hypervisor time stamp in the packet; and forwarding, by the hypervisor, the packet to the peer node;

intercepting, by the hypervisor, the packet transmitted back to the virtual machine from the peer node;

inserting, by the hypervisor, a further hypervisor time stamp in the packet;

forwarding, by the hypervisor, the packet to the virtual machine;

generating, by the virtual machine, a last virtual machine time stamp for the packet.

2. The method according to claim 1, wherein determining whether to insert the hypervisor time stamp or not in the packet is based on properties of the packet such as address and port number.

3. The method according to claim 1, wherein determining whether to insert the hypervisor time stamp or not in the packet is based on the packet being of a predetermined protocol.

4. The method according to claim 3, wherein when the packet is of a Two-Way Active Measurement Protocol, TWAMP, or an Internet Control Message Protocol, ICMP, then the hypervisor time stamp is to be inserted into the packet.

5. The method according to claim 1, further comprising determining the number of hypervisors of the physical machine on which the virtual machine is running and the number of hypervisors of the peer node and defining two hypervisor time stamp fields per hypervisor when creating the packet.

6. The method according to claim 1, further comprising analysing, by the virtual machine, the packet based on the virtual machine time stamps, the hypervisor time stamps comprised in the packet and the last generated virtual machine time stamp.

7. The method according to claim 1, wherein the virtual machine creating the packet comprises an application executed by the virtual machine creating the packet which is to be transmitted to the peer node.

8. A method implemented by a physical machine for performing a performance measurement between a virtual machine and a peer node when the peer node is the initiator of the measurement between the virtual machine and the peer node, the physical machine comprising a hypervisor and the virtual machine, the method comprising:

intercepting, by the hypervisor, a packet destined for the virtual machine;

determining, by the hypervisor, whether to insert a first hypervisor time stamp or not in the packet;

based on the determination to insert the first hypervisor time stamp in the packet, inserting, by the hypervisor, the first hypervisor time stamp in the packet;

forwarding, by the hypervisor, the packet to the virtual machine;

receiving, by the virtual machine, the packet;

inserting, by the virtual machine, a virtual machine time stamp in the packet,
inserting, by the virtual machine, a further virtual machine time stamp in the packet,
transmitting, by the virtual machine, the packet back towards the peer node;
intercepting, by the hypervisor, the packet destined to the peer node;
inserting, by the hypervisor, a further hypervisor time stamp in the packet; and
forwarding, by the hypervisor, the packet towards the peer node.

9. The method according to claim 8, wherein the virtual machine inserting the virtual machine time stamp in the packet comprises an application executed by the virtual machine inserting the virtual machine time stamp in the packet.

10. The method according to claim 8, wherein the hypervisor is further operable to determine whether to insert the hypervisor time stamp or not in the packet based on properties of the packet such as address and port number.

11. The method according to claim 8, wherein the hypervisor is further operable to determine whether to insert the hypervisor time stamp or not in the packet based on the packet being of a predetermined protocol.

12. The method according to claim 11, wherein when the packet is of a Two-Way Active Measurement Protocol, TWAMP, or an Internet Control Message Protocol, ICMP, then the hypervisor is further operable to insert the hypervisor time stamp into the packet.

13. A physical machine configured for performing a performance measurement between a virtual machine and a peer node when the virtual machine is the initiator of the measurement between the virtual machine and the peer node, the physical machine comprising:
the virtual machine comprising a processing unit, and a memory that stores processor-executable code, wherein the processing unit interfaces with the memory to execute the processor-executable code, whereby the virtual machine is operable to:
create a packet which is to be transmitted to the peer node;
initialize the packet by inserting a first virtual machine time stamp in the packet; and,
transmit the packet towards the peer node;
the hypervisor comprising a processing unit, and a memory that stores processor-executable code, wherein the processing unit interfaces with the memory to execute the processor-executable code, whereby the hypervisor is operable to:
intercept the packet transmitted from the virtual machine, the packet comprising a destination address to the peer node;
determine whether to insert a first hypervisor time stamp or not in the packet;
based on the determination to insert the first hypervisor time stamp in the packet, insert the first hypervisor time stamp in the packet;
forward the packet to the peer node;
intercept the packet transmitted back to the virtual machine from the peer node;
insert a further hypervisor time stamp in the packet;
forward the packet to the virtual machine;
the virtual machine further operable to:
generate a last virtual machine time stamp for the packet.

14. The physical machine according to claim 13, wherein the virtual machine is further operable to determine a number of hypervisors of the physical machine on which the virtual machine is running and the number of hypervisors of the peer node and defining two hypervisor time stamp fields per hypervisor when creating the packet.

15. The physical machine according to claim 13, wherein the virtual machine is further operable to analyze the packet based on the virtual machine time stamps, the hypervisor time stamps comprised in the packet and the generated last virtual machine time stamp.

16. The physical machine according to claim 13, wherein the virtual machine creating the packet comprises an application executed by the virtual machine creating the packet which is to be transmitted to the peer node.

17. A physical machine configured for performing a performance measurement between a virtual machine and a peer node when the peer node is the initiator of the measurement between the virtual machine and the peer node, the physical machine comprising:
the hypervisor comprising a processing unit, and a memory that stores processor-executable code, wherein the processing unit interfaces with the memory to execute the processor-executable code, whereby the hypervisor is operable to:
intercept a packet destined for the virtual machine;
determine whether to insert a first hypervisor time stamp or not in the packet;
based on the determination to insert the first hypervisor time stamp in the packet, insert the first hypervisor time stamp in the packet;
forward the packet to the virtual machine;
the virtual machine comprising a processing unit, and a memory that stores processor-executable code, wherein the processing unit interfaces with the memory to execute the processor-executable code, whereby the virtual machine is operable to:
receive the packet;
insert a virtual machine time stamp in the packet;
insert a further virtual machine time stamp in the packet;
transmit the packet back towards the peer node;
the hypervisor further operable to:
intercept the packet destined to the peer node;
insert a further hypervisor time stamp in the packet; and
forward the packet towards the peer node.

18. The physical machine according to claim 17, wherein the virtual machine inserting the virtual machine time stamp in the packet comprises an application executed by the virtual machine inserting the virtual machine time stamp in the packet.

19. A non-transitory computer-readable medium containing computer readable code means, which when run in a processing unit comprised in a physical machine, causes the physical machine to perform a method for performing a performance measurement between a virtual machine and a peer node when the peer node is the initiator of the measurement between the virtual machine and the peer node, the physical machine comprising a hypervisor and the virtual machine, the method comprising:
intercepting, by the hypervisor, a packet destined for the virtual machine and the packet comprising a destination address to the virtual machine;
determining, by the hypervisor, whether to insert a hypervisor time stamp or not in the packet;

based on the determination to insert the hypervisor time stamp in the packet, inserting, by the hypervisor, the hypervisor time stamp in the packet; and forwarding, by the hypervisor, the packet to the virtual machine according to the destination address;

receiving, by the virtual machine, the packet;

inserting, by the virtual machine, a virtual machine time stamp in the packet, inserting, by the virtual machine, a further virtual machine time stamp in the packet, transmitting, by the virtual machine, the packet back towards the peer node;

intercepting, by the hypervisor, the packet destined to the peer node;

inserting, by the hypervisor, a further hypervisor time stamp in the packet; and forwarding, by the hypervisor, the packet towards the peer node.

20. A non-transitory computer-readable medium containing computer readable code means, which when run in a processing unit comprised in a physical machine, causes the physical machine to perform a method for performing a performance measurement between a virtual machine and a peer node when the virtual machine is the initiator of the measurement between the virtual machine and the peer node, the physical machine comprising a hypervisor and the virtual machine, the method comprising:

creating, by the virtual machine, the packet which is to be transmitted to the peer node;

initializing, by the virtual machine, the packet comprising inserting a first virtual machine time stamp in the packet;

transmitting, by the virtual machine, the packet towards the peer node;

intercepting, at the hypervisor, the packet transmitted from the virtual machine, the packet comprising a destination address to the peer node;

determining, at the hypervisor, whether to insert a hypervisor time stamp or not in the packet;

based on the determination to insert the hypervisor time stamp in the packet, inserting, at the hypervisor, the hypervisor time stamp in the packet; and forwarding, by the hypervisor, the packet to the peer node intercepting, by the hypervisor, the packet transmitted back to the virtual machine from the peer node;

inserting, by the hypervisor, a further hypervisor time stamp in the packet;

forwarding, by the hypervisor, the packet to the virtual machine;

generating, by the virtual machine, a last virtual machine time stamp for the packet.

* * * * *